United States Patent
Huang et al.

(10) Patent No.: US 12,475,295 B2
(45) Date of Patent: Nov. 18, 2025

(54) MACHINE-LEARNING-BASED POWER/GROUND (P/G) VIA REMOVAL

(71) Applicant: Synopsys, Inc., Mountain View, CA (US)

(72) Inventors: Ping-Wei Huang, Taipei (TW); Hsiang-Wen Chang, Taipei (TW); Yao-Wen Chang, Taipei (TW)

(73) Assignee: Synopsys, Inc., Sunnyvale, CA (US)

( * ) Notice: Subject to any disclaimer, the term of this patent is extended or adjusted under 35 U.S.C. 154(b) by 759 days.

(21) Appl. No.: 17/841,400

(22) Filed: Jun. 15, 2022

(65) Prior Publication Data

US 2022/0405458 A1   Dec. 22, 2022

Related U.S. Application Data

(60) Provisional application No. 63/211,345, filed on Jun. 16, 2021.

(51) Int. Cl.
*G06F 30/394*   (2020.01)
*G06F 30/27*   (2020.01)
*G06F 30/392*   (2020.01)
*G06N 3/042*   (2023.01)
*G06N 3/0464*   (2023.01)
(Continued)

(52) U.S. Cl.
CPC ........ *G06F 30/394* (2020.01); *G06V 10/7715* (2022.01); *G06V 10/82* (2022.01); *G06F 30/27* (2020.01); *G06F 30/392* (2020.01); *G06F 2119/06* (2020.01); *G06N 3/042* (2023.01); *G06N 3/0464* (2023.01); *G06N 3/08* (2013.01); *G06N 7/00* (2013.01); *G06N 20/00* (2019.01)

(58) Field of Classification Search
CPC ...... G06F 30/394; G06F 30/392; G06F 30/27; G06F 2119/06; G06V 10/7715; G06V 10/82; G06N 3/042; G06N 3/0464; G06N 3/08; G06N 5/00; G06N 7/00; G06N 20/00
USPC ..... 716/127, 120, 129, 130, 133; 703/14, 18
See application file for complete search history.

(56) References Cited

U.S. PATENT DOCUMENTS

| | | |
|---|---|---|
| 10,678,973 B2 * | 6/2020 | Chuang ............... G06F 30/3308 |
| 11,017,149 B2 * | 5/2021 | Chuang ................ G06F 30/373 |

(Continued)

FOREIGN PATENT DOCUMENTS

| | | | | |
|---|---|---|---|---|
| DE | 102019112439 A1 * | 4/2020 | ............. | G06F 30/27 |
| DE | 102019116061 A1 * | 4/2020 | ........... | G06F 30/327 |

OTHER PUBLICATIONS

PCT International Search Report and Written Opinion for International Application No. PCT/US2022/033646, mailed Oct. 4, 2022, 11 pages.

(Continued)

*Primary Examiner* — Phallaka Kik
(74) *Attorney, Agent, or Firm* — Lowenstein Sandler LLP

(57) ABSTRACT

A method, a system, and non-transitory computer readable medium for power and ground (P/G) routing for an integrated circuit (IC) design are provided. The method includes generating input features for a machine-learning (ML) model based on IR drop and routing congestion analysis for a P/G network for the IC design, and modifying a set of P/G vias or a set of P/G wires in the P/G network according to modifications identified by the ML model. The ML model comprises a feature extractor pre-trained using a plurality of images of P/G vias and P/G wires.

20 Claims, 23 Drawing Sheets

(51) Int. Cl.
    *G06N 3/08* (2023.01)
    *G06N 7/00* (2023.01)
    *G06N 20/00* (2019.01)
    *G06V 10/77* (2022.01)
    *G06V 10/82* (2022.01)
    *G06F 119/06* (2020.01)

(56) References Cited

U.S. PATENT DOCUMENTS

| | | | | |
|---|---|---|---|---|
| 11,734,485 | B1* | 8/2023 | Posser | G06F 30/392 |
| | | | | 716/129 |
| 2018/0268096 | A1* | 9/2018 | Chuang | G06F 30/27 |
| 2020/0272777 | A1* | 8/2020 | Chuang | G06F 30/3308 |
| 2023/0214575 | A1* | 7/2023 | Chuang | G06F 30/394 |
| | | | | 716/104 |
| 2023/0306182 | A1* | 9/2023 | Chou | G06F 30/398 |
| 2025/0045503 | A1* | 2/2025 | Chou | G06N 20/00 |

OTHER PUBLICATIONS

Xie et al., "Fast IR Drop Estimation with Machine Learning : Invited Paper", Proceedings of the IEEE/ACM International Conference on Computer Aided Design, Nov. 2, 2020 (Nov. 2, 2020), p. 1-8, KP033898095.

Chang et al., "Generating Routing-Driven Power Distribution Networks with Machine-Learning Technique", Proceedings of the ACM International Symposium on Physical Design, Apr. 3, 2016 (Apr. 3, 2016), p. 145-152, XP058079811.

Chhabria et al., "Template-based PDN Synthesis in Floorplan and Placement Using Classifier and CNN Techniques", Proceedings of the 25th Asia and South Pacific Design Automation Conference, Jan. 13, 2020 (Jan. 13, 2020), 6 pgs., XP033746255.

Anonymous, "k-means clustering—Wikipedia", Feb. 15, 2018 (Feb. 15, 2018), Retrieved from the Internet on Jun. 28, 2023, URL: https://en.wikipedia.org/w/index.php?title=K-means_clustering&oldid=825776409, 15 pgs., XP055576495.

* cited by examiner

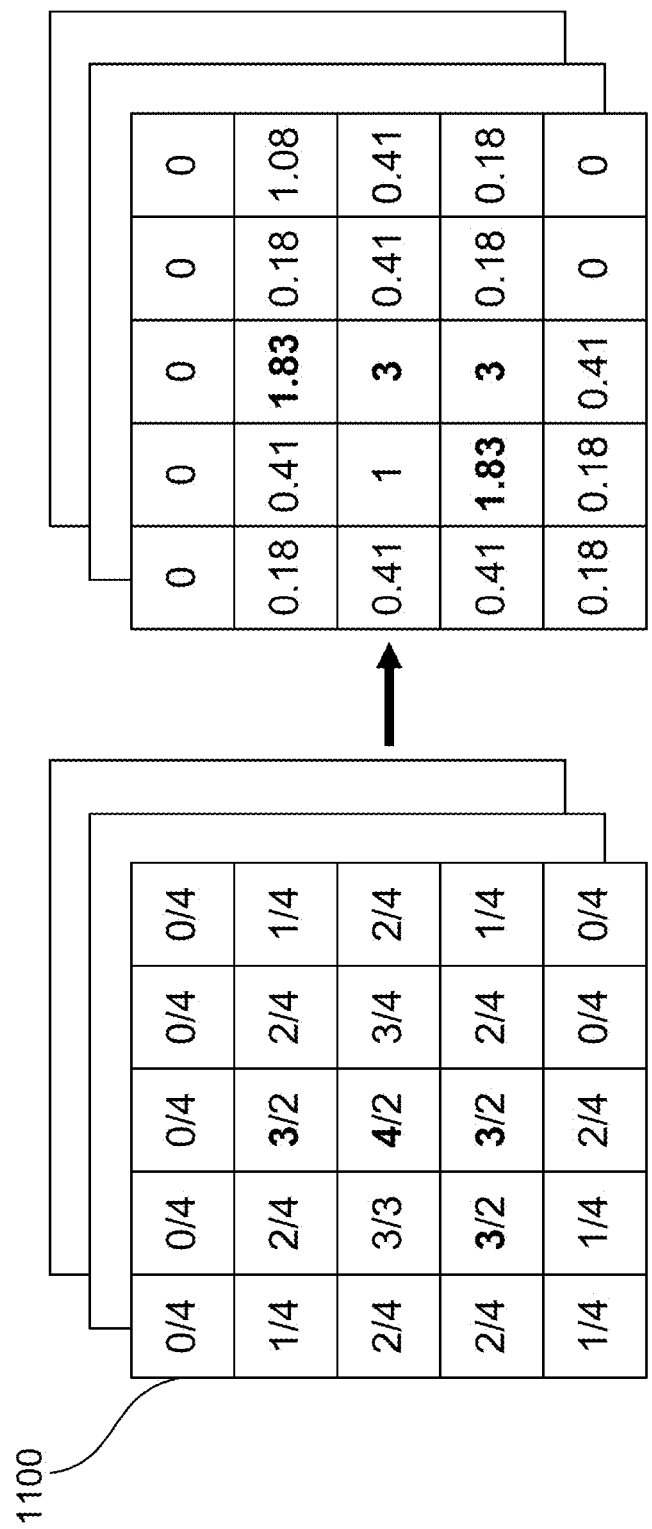

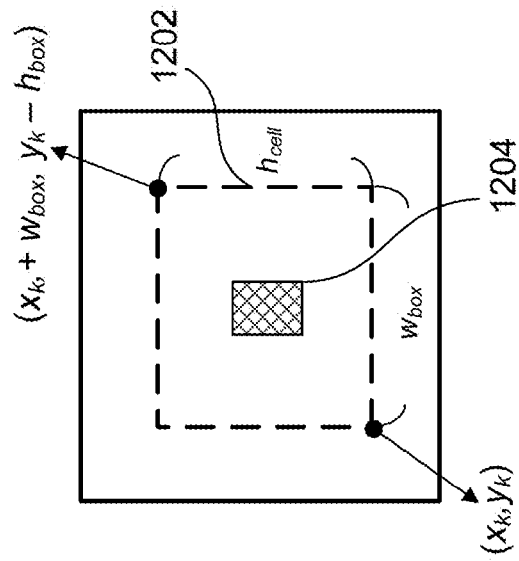
FIG. 12B
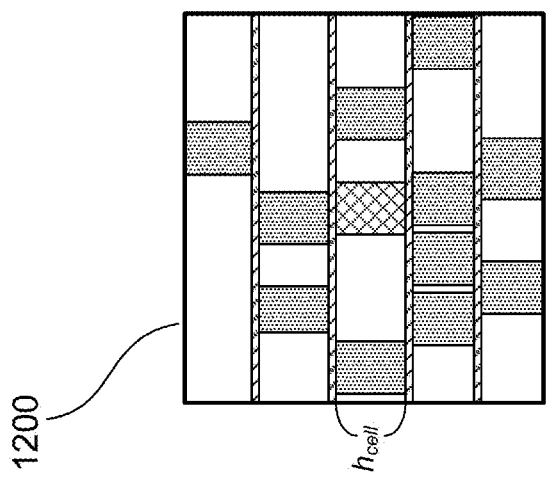
FIG. 12A
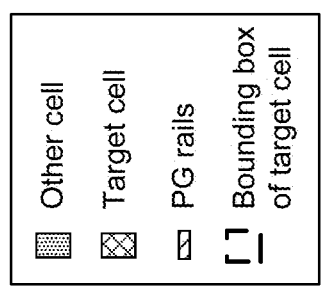

MACHINE-LEARNING-BASED POWER/GROUND (P/G) VIA REMOVAL

RELATED APPLICATION

The present application claims the benefit under 35 U.S.C. § 119(e) of U.S. Provisional Patent Application No. 63/211,345 filed on Jun. 16, 2021, which is incorporated herein by reference in its entirety for all purposes.

TECHNICAL FIELD

The present disclosure relates to electronic design automation. In particular, the present disclosure is related to machine-learning (M/L) based power/ground (P/G) via removal.

BACKGROUND

In a very large-scale integrated circuit (VLSI) design, an external voltage source or a tap may supply current for an entire VLSI chip. An IR voltage drop may occur along a conductor carrying current from the external voltage source (or other voltage supply) to a load due to the resistance of the conductor. The IR voltage drop may lead to a reduced supply voltage. During the integrated circuit design and planning stages, the IR voltage drop is considered. Alternative designs may be considered based on an expected IR voltage drop and load requirements.

SUMMARY

In some aspects, a method includes generating input features for a machine-learning (ML) model based on IR drop and routing congestion analysis for a P/G network for the IC design, and modifying a set of P/G vias or a set of P/G wires in the P/G network according to modifications identified by the ML model. The ML model includes a feature extractor pre-trained using a plurality of images of P/G vias and P/G wires.

In some aspects, a system for power and ground (P/G) routing for an integrated circuit (IC) includes a memory storing instructions, and a processor, coupled with the memory and to execute the instructions. The instructions when executed cause the processor to generate input features for a machine-learning (ML) model based on IR drop and routing congestion analysis for a P/G network for the IC design, and modify a set of P/G vias or a set of P/G wires in the P/G network according to modifications identified by the ML model. The ML model includes a feature extractor pre-trained using a plurality of images of P/G vias and P/G wires.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 11A and 11B show an example of routing grids and routing congestion score calculation, in accordance with an embodiment of the present disclosure.

FIG. 12A is a schematic that illustrates an IC layout with cells and P/G rails, in accordance with an embodiment of the present disclosure.

FIG. 12B is a schematic that illustrates a bounding box for a target cell, in accordance with an embodiment of the present disclosure.

DETAILED DESCRIPTION

Aspects of the present disclosure relate to machine-learning based power/ground (P/G) via removal.

A voltage drop effect occurs when a current goes through a resistance or a power distribution network of an integrated circuit (IC) design. The voltage drop effect may cause a degradation in the performance of the IC design. A designer may plan a P/G structure or network during a power planning stage of a physical implementation process of the IC design based on a power dissipation and a power density of the IC design of a very large-scale integrated circuit (VLSI) chip. The P/G structure provides a supply voltage from an external power pad or an external voltage source to a standard cell to ensure that the standard cell works properly. However, problems due to the voltage drop may still occur even when using voltage drop estimation methods when planning the P/G structure. Therefore, the designer generally tends to over-design the P/G network during the power planning stage. The over-dense P/G network can decrease available routing resources and increase the time used to modify the P/G network for re-routing and when fixing design rule check (DRC) violations.

The approaches described herein include training a multi-objective machine-learning (ML) model to speed up turn-around time during a placement stage of the physical implementation process of the IC design. The ML model is trained using four types of input features. Thereby, the ML model may estimate IR drop distribution and routing congestion of the IC design more efficiently than currently available commercial tools. One of the objectives of the ML model may be an optimization scheme to solve a tradeoff between routing resources and IR drop as described further below. In addition, the present disclosure also describes two heuristic-based selection methods to remove via/wire that shows a significant improvement on routing resources and fewer IR drop degradation. In addition, layout information of the IC design are converted into images. The images may be used an input features of the ML model.

Technical advantages of the present disclosure include, but are not limited to, improve a runtime during the placement stage of a design flow, improve the availability of routing resources without IR degradation, solve the problem of little routing information in early design stages, minimize wasting routing resources, and solve the trade-off between routing resources and signal integrity. The runtime is improved due to fewer iterations from a routing stage to a power planning stage. Various embodiments proposed in this disclosure accelerate the overall runtime by ten times or more. The ML model has a high accuracy in predicting a congestion score and a voltage drop for the IC design.

Figure 1:
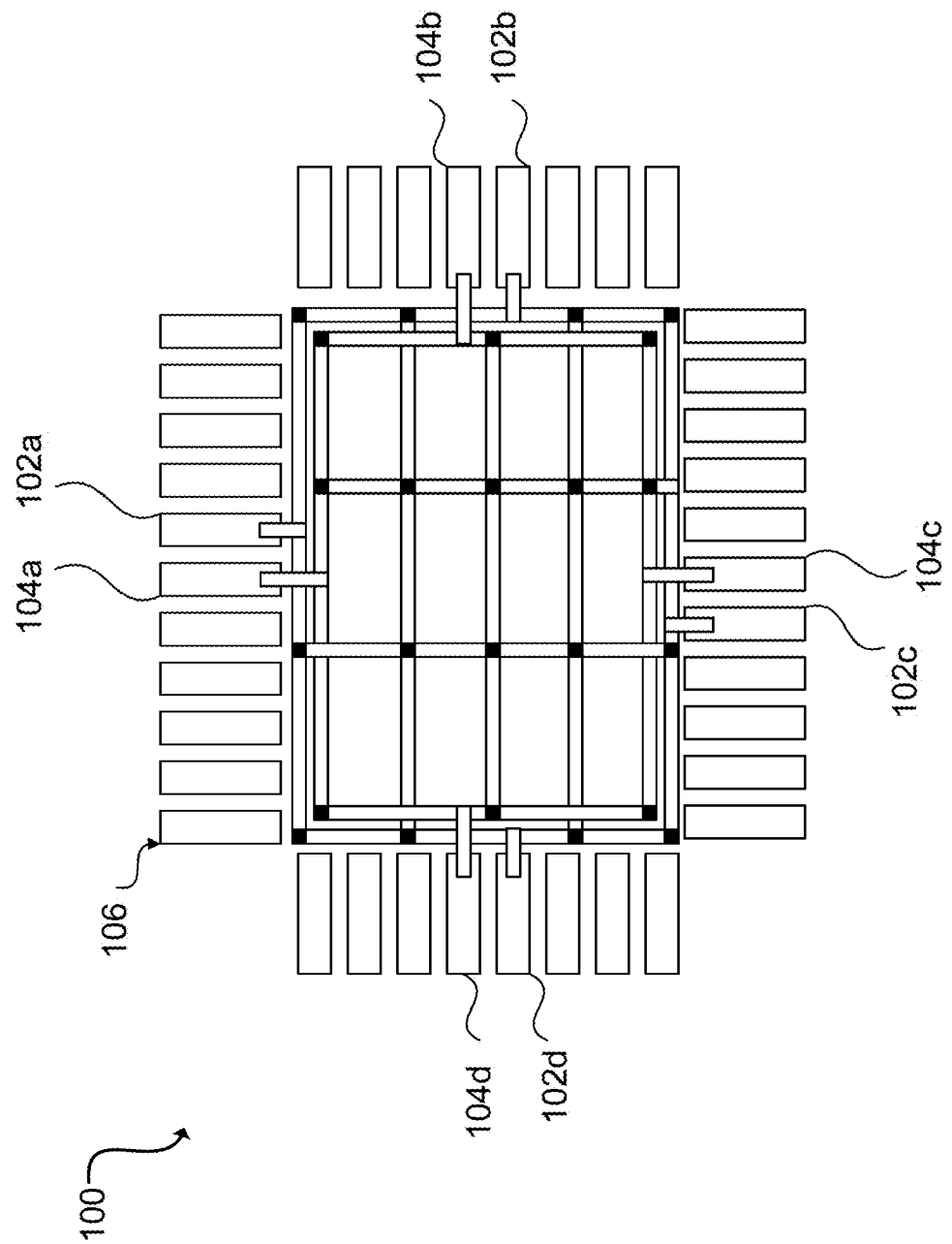
FIG. 1 a schematic that shows a view of a power/ground (P/G) network, in accordance with an embodiment of the present disclosure.

FIG. 1 is a schematic that shows a view of a P/G network 100, in accordance with an embodiment of the present disclosure. P/G network 100 may include one or more power pads 102a, 102b, 102c, and 102d (e.g., supply power VDD), one or more ground pads 104a, 104b, 104c, and 104d (e.g., GND), and one or more input/output (I/O) pads 106. The one or more power pads 102a, 102b, 102c, and 102d may provide power for the IC design from an external supply voltage or a current source. The one or more ground pads 104a, 104b, 104c, and 104d may provide ground connections for the IC design. The one or more I/O pads 106 may provide input and output connections from and to other components in the IC design.

Figure 2:
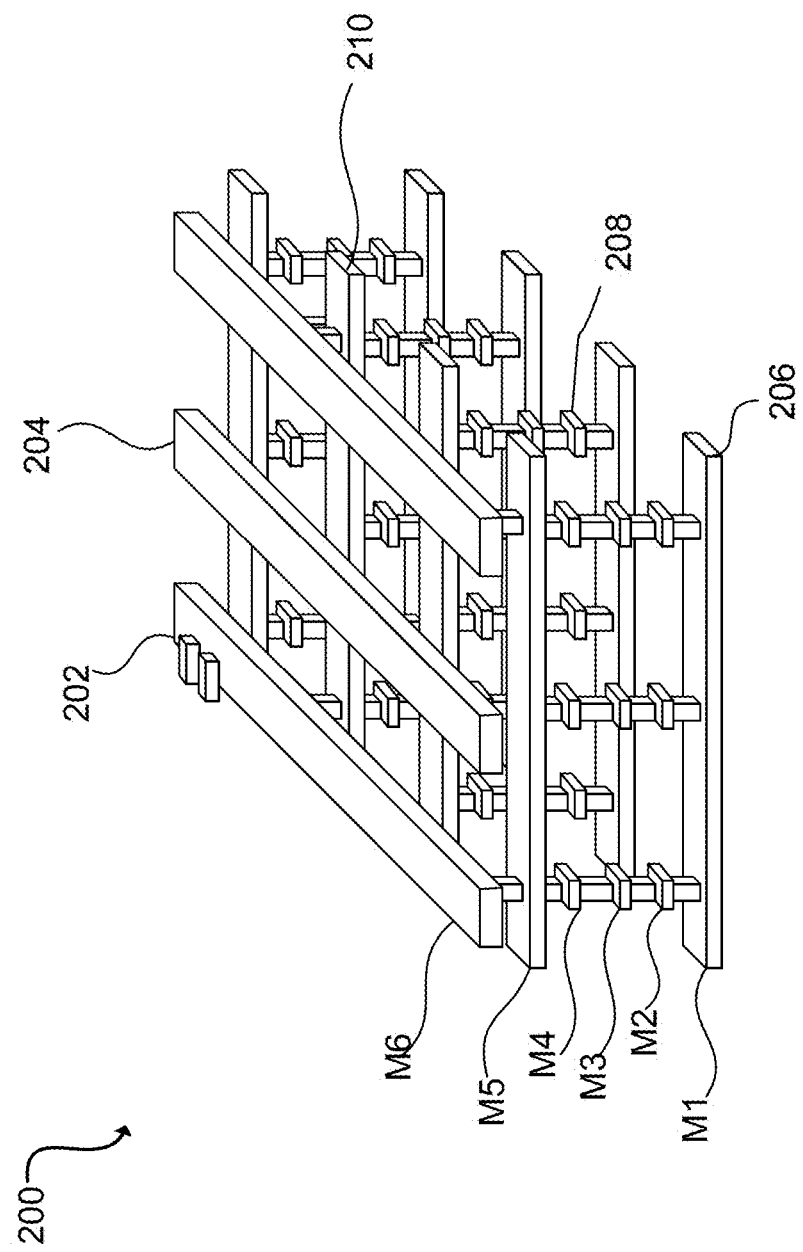
FIG. 2 is a schematic that shows a perspective view of the P/G network, in accordance with an embodiment of the present disclosure.

FIG. 2 is a schematic that shows a perspective view of a P/G network 200, in accordance with an embodiment of the present disclosure. P/G network 200 may include multiple layers. For example, six different metal layers M1 to M6 of the IC are shown. A power pad 202 (e.g., VDD) may supply a supply voltage (e.g., an ideal voltage) to the IC design. A ground pad 204 may provide ground connections to the IC design. Power pad 202 may represent one or more power pads and ground pad 204 may represent one or more ground pads. A power stripe 210 may provide a connection to the power pad 202 and a ground pad 204 on a top metal layer (labelled M6 in FIG. 2). Similarly, a stacked via 208 may connect a power stripe 210 and a power rail 206 to P/G pins.

Figure 3:
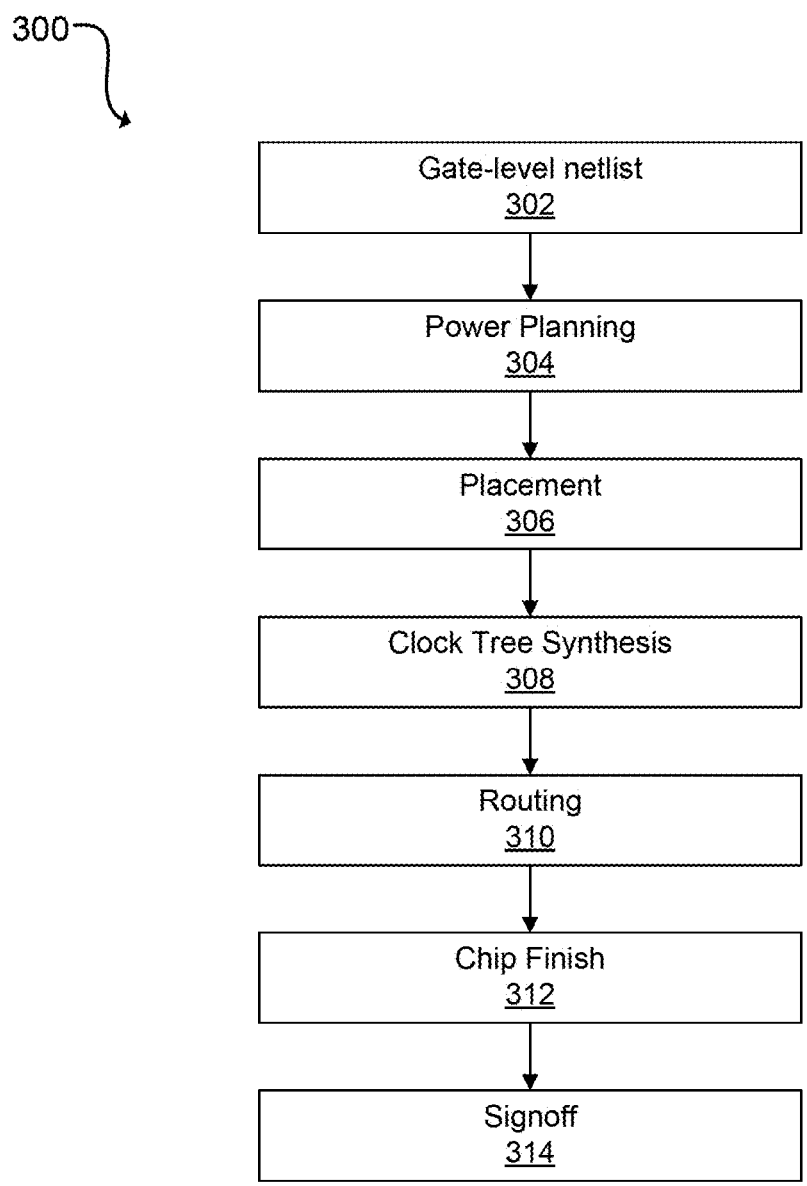
FIG. 3 is a flowchart for a physical design flow, in accordance with an embodiment of the present disclosure.

FIG. 3 is a flowchart for a physical design flow 300, in accordance with an embodiment of the present disclosure. Physical design flow 300 may include gate-level netlist creation 302, power planning 304, placement 306, clock tree synthesis 308, routing 310, chip finishing or finalizing 312, and signoff or delivery 314. During the gate-level netlist creation, a behavioral-level design may be converted into a gate-level netlist. During the power planning 304, the P/G network is designed. An IC designer may consider an effective resistance from an external voltage source to a standard cell and design the P/G network to avoid severe voltage drop problems. As the voltage drop occurs due to path resistance and other resistance, the available voltage may drop and lead to performance degradation. The performance degradation may occur since the lower voltage may cause a load capacitor of the standard cell to charge or discharge slowly. During the placement 306, circuit components such as transistors or capacitors are positioned. During clock tree synthesis 308, a clock distribution network to provide a clock signal to drive one or more elements of the IC design is generated. In routing 310, circuit components are connected using multiple conductors. During chip finishing or finalizing 312, metal fill may be performed.

In some aspects, one or more areas of the IC design may suffer from high IR drop. IR drop may cause a reduction in the circuit speed and may cause functional failure due to reduced noise margin. By way of a non-limiting example, the voltage drop (IR drop) may be categorized into two types: static and dynamic. Static IR drop may be measured by an average current flowing through the path. The higher value of IR drop means a more severe IR drop. Static IR drop is related to the robustness of P/G network and average current. The static IR may be calculated as follows: $IR_{static} = I_{avg} \times R_{wire}$ where $I_{avg}$ is an average current in a power rail and $R_{wire}$ is a parasitic resistance in a power rail. Dynamic IR drop may consider an effect of resistor's, inductances, and capacitor's (RC) transient behavior.

Figure 4A:
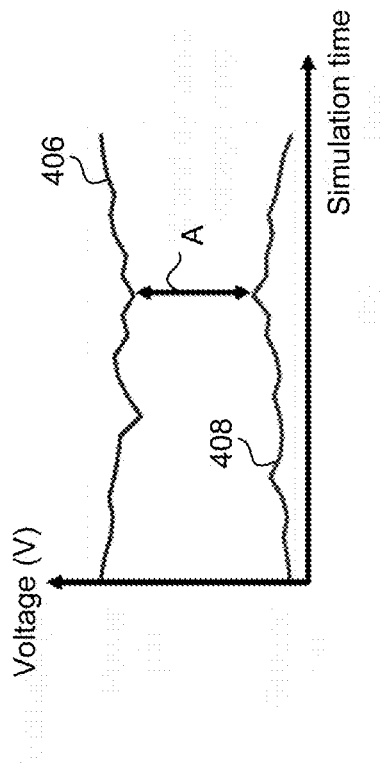
FIG. 4A is a schematic that illustrates a graph of a dynamic current and an average current from a clock rising edge, in accordance with an embodiment of the present disclosure.

FIG. 4A is a schematic that illustrates a graph of a dynamic current 402 and an average current 404 from a clock rising edge, in accordance with an embodiment of the present disclosure. The dynamic IR drop may depend on the switching activities of the cell instances and simultaneous switching in a region that may result in peak current flow. A design without static IR may include dynamic IR drop violation.

Figure 4B:
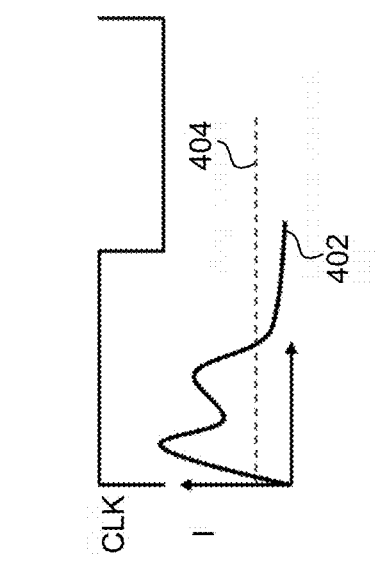
FIG. 4B is a schematic that illustrates a graph of dynamic voltage drop over time, in accordance with an embodiment of the present disclosure.

FIG. 4B is a schematic that illustrates a graph of dynamic voltage drop over time in accordance with an embodiment of the present disclosure. During IR drop analysis the voltage at power pins and the voltage at ground pins are considered simultaneously. Graph 406 shows the voltage of a power pin with respect to a simulation time. Graph 408 shows the voltage of a ground pin with respect to the simulation time. A worst dynamic voltage drop is indicated by label A in FIG. 4B. The dynamic IR drop may also be affected by capacitors and inductors.

As the P/G network density increases, it may lead to a decrease in the routing resources and may also cause DRC problems and timing violations.

Figure 5:
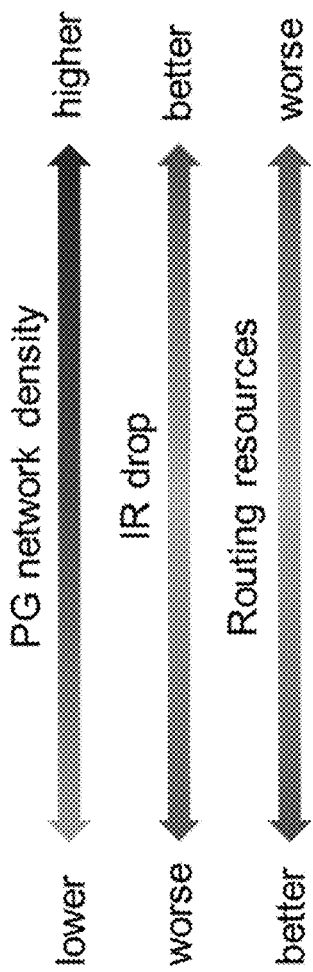
FIG. 5 is a schematic that illustrates a tradeoff between a P/G network density, a voltage drop (IR drop), and routing resources, in accordance with an embodiment of the present disclosure.

FIG. 5 is a schematic that illustrates a tradeoff between P/G network density, voltage drop (IR drop), and routing resources, in accordance with an embodiment of the present disclosure. With the decrease in the P/G network density, the available routing resources may increase, but the IR drop problems may become more severe. And, while the IR drop problems may become less severe with the increased P/G network density, the available routing resources may decrease. PG vias may act as obstacles for signal net routing. Thus, more PG nets may reduce routing resources while fewer PG nets may lead to a worse IR drop.

Due to the high cost of re-designing a whole IC layout, typically, the IC designer may apply some types of ECO (engineering change order). These changes may make slight changes to a layout and make sure the IC designs pass all the constraints, including DRC, timing, and voltage drop.

In some embodiments, the ECO on P/G network may be categorized into several types, including wire widening, wire insertion, wire removal, via insertion, via removal, via enlargement, and the like. Wire widening may increase a width of a wire by x times, where x may be an integer. In some aspects, x may be greater than one. Wire insertion may insert a new shape or a segment of a wire to connect two existing wires with the same power type to lower its effective resistance and voltage drop (IR drop). By way of a non-limiting example, the wire insertion may be accompanied by a via insertion that may insert a via to connect one upper-layer wire with one lower-layer wire. The upper-layer wire and the lower-layer wire may be of the same power type. The via insertion may provide an extra path for current to run through that reduces the effective resistance of a wire. Wire removal may remove a shape or a segment of a wire without changing wire connectivity. Wire removal may increase an effective resistance but may provide more routing resources for a router to find solutions for fixing DRC violations and timing constraints. Wire removal may also decrease a total wire length and affect timing constraints. By way of a non-limiting example, the wire removal may be accompanied by a via removal in which a via may be removed without changing connectivity. Similar to the wire removal, a via removal may also increase routing resources for a router. Via enlargement is similar to wire widening. Via enlargement may add more vias to an existing via or a via array. While the via enlargement may reduce the routing resources, it may reduce the effective resistance, as shown in FIG. 6.

Figure 6:
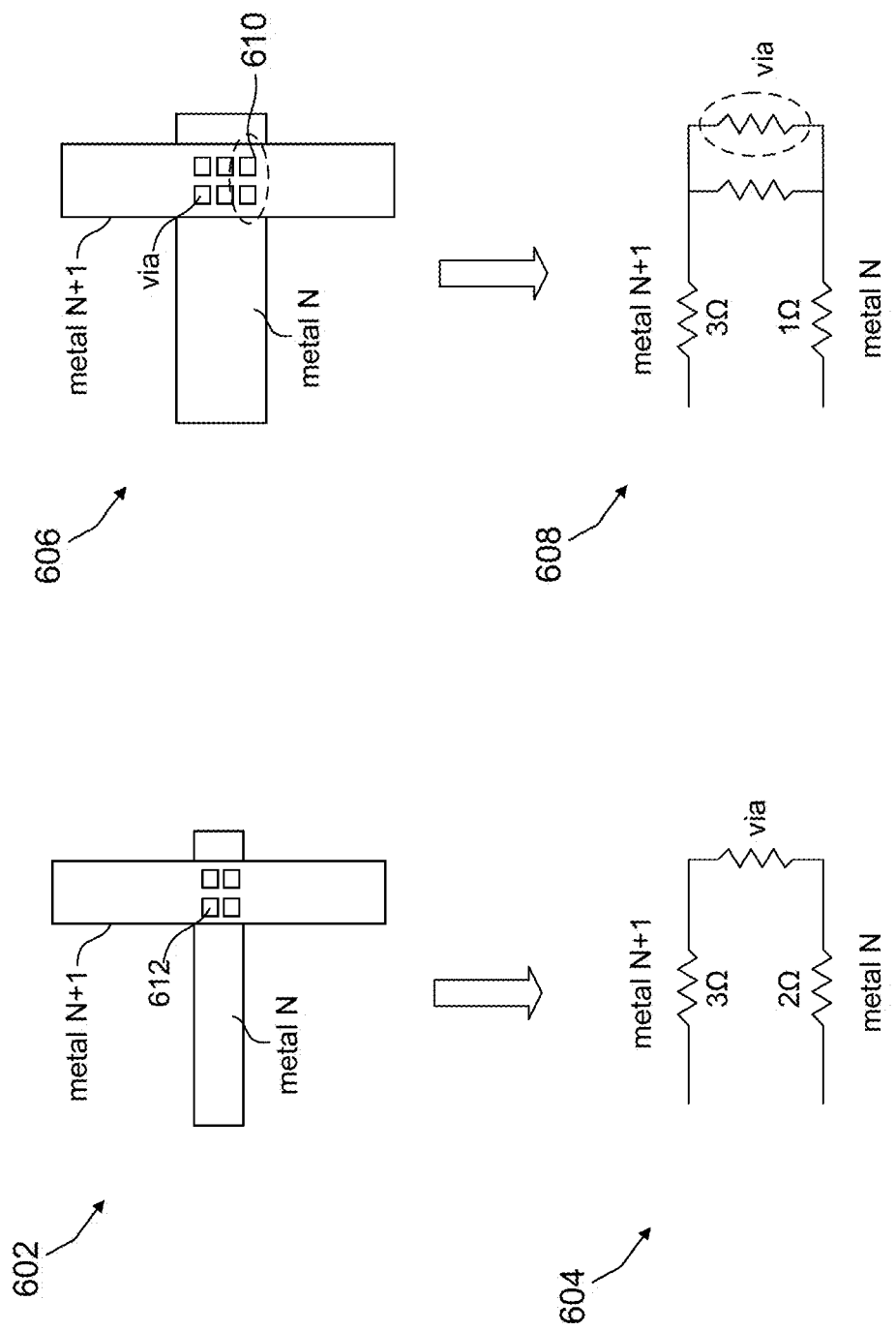
FIG. 6 is a schematic that illustrates an effect of via enlargement, in accordance with an embodiment of the present disclosure.

FIG. 6 is a schematic that illustrates an effect of via enlargement, in accordance with an embodiment of the present disclosure. Schematic 602 shows the P/G network before via enlargement. Schematic 604 shows a resistance model associated with schematic 602. Schematic 606 shows the P/G network after via enlargement. Schematic 606 shows the resistance model associated with schematic 606. As shown in schematic 606, two additional vias 610 are added to an existing via array 612. This in turn reduces the effective resistance as shown in schematic 608 by reducing the resistance due to the metal layer (labelled N in FIG. 6) and adding a resistance in parallel to the existing resistance.

To avoid thousands of ECOs to fix problems of congestion and IR drop, the IC designer may over-design a P/G network at an early stage, as described previously herein, then remove the existing wires for more routing resources.

A commercial tool (e.g., a place and route tool) may estimate a congestion map in the placement and routing (P&R) stage of physical design (e.g., at stage 306 and 310 of FIG. 3). The congestion map includes uniform and non-uniform routing grids. Each routing grid has a demand and capacity as shown in FIG. 7.

Figure 7:
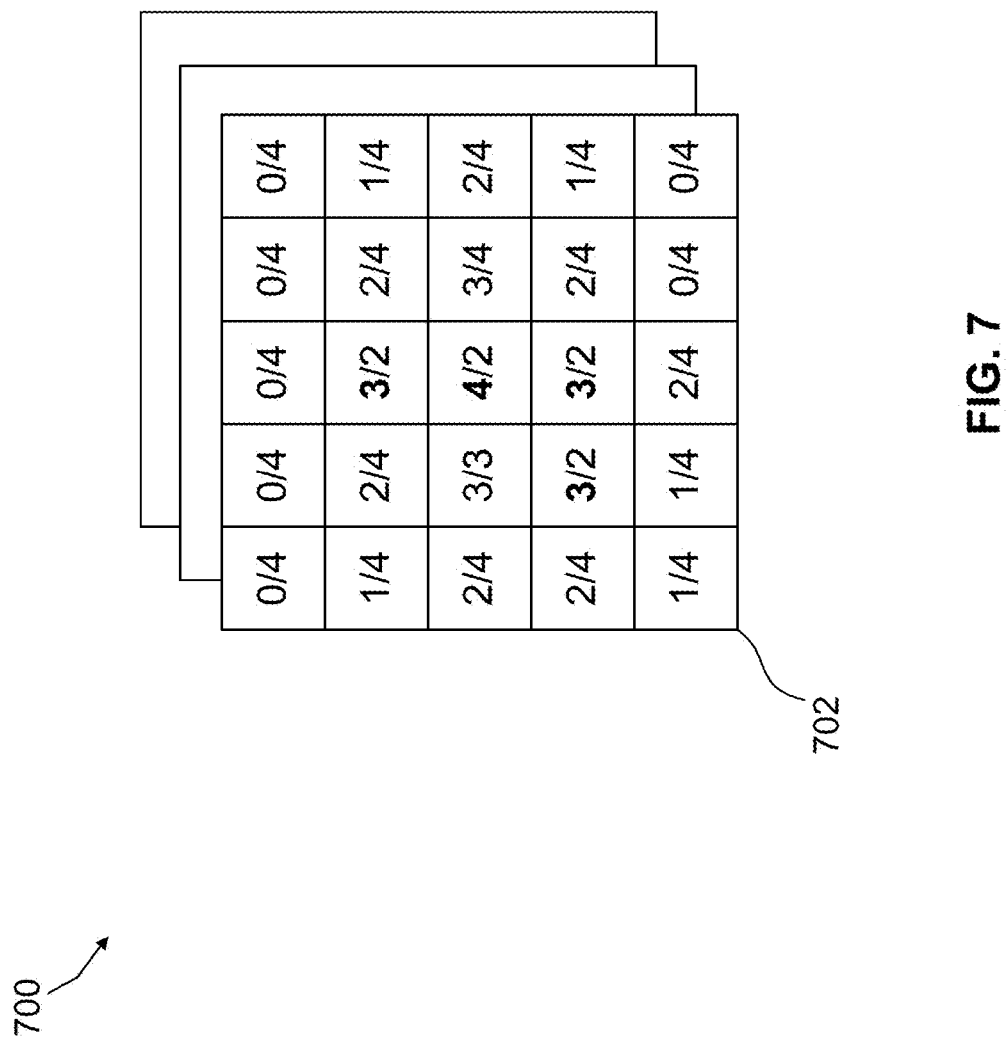
FIG. 7 is a schematic that illustrates a demand versus a capacity of a routing grid, in accordance with an embodiment of the present disclosure.

FIG. 7 is a schematic 700 that illustrates a demand versus a capacity of a routing grid, in accordance with an embodiment of the present disclosure. The demand represents the number of wires to pass through a grid 702. Each grid in FIG. 7 is labelled with a demand/capacity. The first number represents the demand and the second number represents the capacity. The capacity indicates the maximum number of wires allowed to pass through the grid 702. If the demand is higher than capacity, it is called overflow. For example, four grids have overflow in schematic 700 (e.g., 3/2, 4/2). These routing grids with overflow are called congested. A router may re-route these congested routing grids to avoid high wire density, high complexity of making photomask, and the effect of coupling capacitance.

Due to the high time complexity of IR drop analysis, in some embodiments, an approximation algorithm or ML-based methods may be used to estimate the IR drop distribution. Accordingly, feedback may be provided for quick iterations of the ECO. In some embodiments, IR drop distribution after cell relocation, dynamic IR-drop ECO optimization, and prediction for cell relocation may be performed using a ML model to guide cell relocation. Some ML models may use a single-engine for IR drop or congestion prediction.

Figure 8:
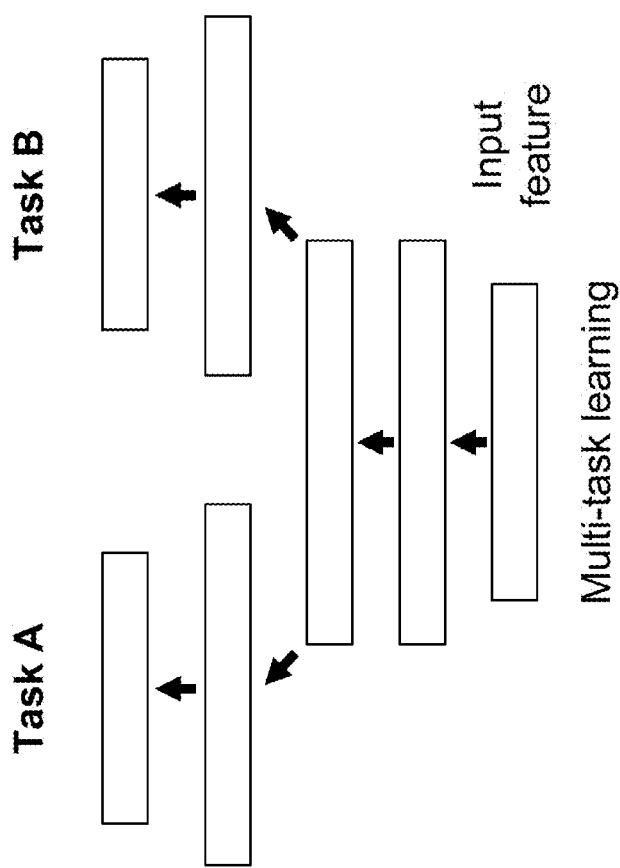
FIG. 8 is a schematic that illustrates multitask-based IR drop and other predictions in a P/G network, in accordance with an embodiment of the present disclosure.

FIG. 8 is a schematic that illustrates multitask-based IR drop and other predictions in a P/G network, in accordance with an embodiment of the present disclosure. As shown in FIG. 8, multiple task objectives may be achieved based on input features described below. The objectives may be achieved using machine-learning frameworks such as multilayer feedforward neural network (MFNN) and/or convolutional neural network (CNN). One of the objectives, for example, maybe an optimization scheme to solve the tradeoff between routing resources and IR drop. In some instances, a significant speed-up compared to the currently available tools may be observed.

In a typical P/G network planning process, the process may go back to a power planning stage to modify the P/G network if there are not enough routing resources during a routing stage. In some embodiments, the P/G network planning approach described herein may provide more routing resources and fewer IR drop overhead with fewer iterations from the routing stage to the power planning stage.

Figure 9:
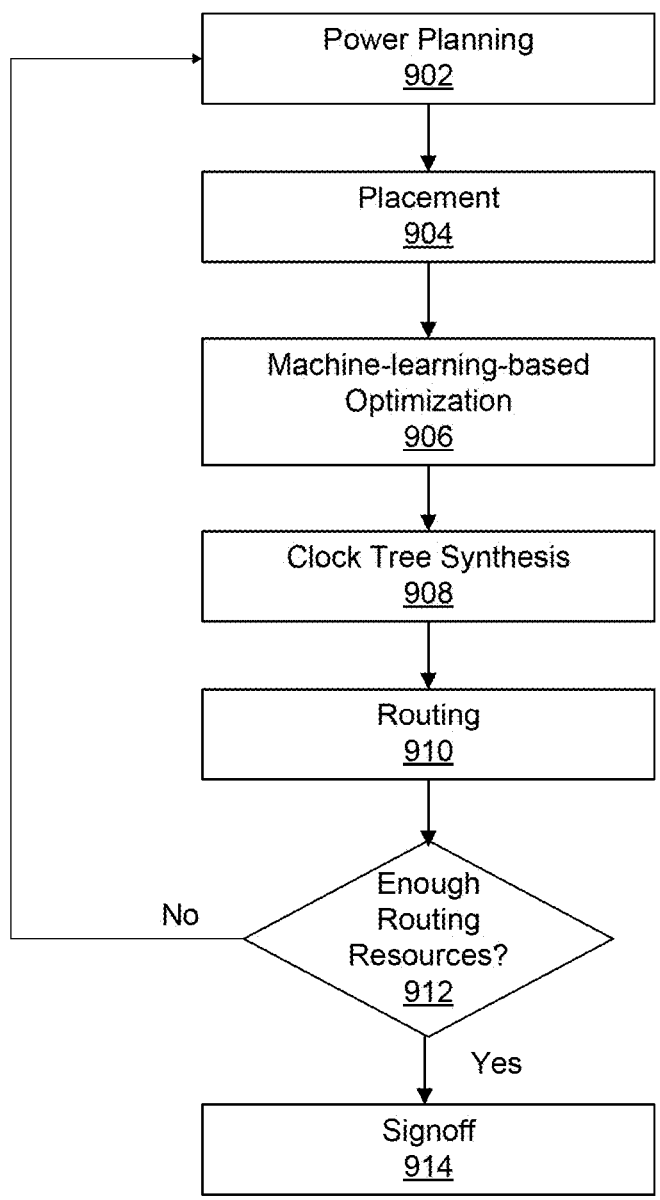
FIG. 9 is a flowchart for a P/G network planning process, in accordance with an embodiment of the present disclosure.

FIG. 9 is a flowchart for a P/G network planning process 900, in accordance with an embodiment of the present disclosure. In 902, a P/G network is designed as described previously herein. In 904, placement of circuit components is performed. In 906, a machine-learning based optimization may be performed as describe further below. the ML based optimization may use the multi-objective model to modify one or more P/G vias and/or wires.

In 908, a clock tree synthesis is performed. In 910, a routing is performed between the circuit components.

In 912, a determination is made whether there are enough routing resources. In response to determining that there is enough routing resources (i.e., resulting in a yes in step 912), the process proceeds to the sign off stage (914). In response to determining that there are not enough routing resources, the process proceeds to step 902 where the power planning is repeated. In some aspects, the determination is made based on a routing capacity of each cell. The routing capacity may depend on available routing tracks and pin density.

In some embodiments, the machine-learning based optimization (906) may be performed after the clock tree synthesis (908).

Figure 10:
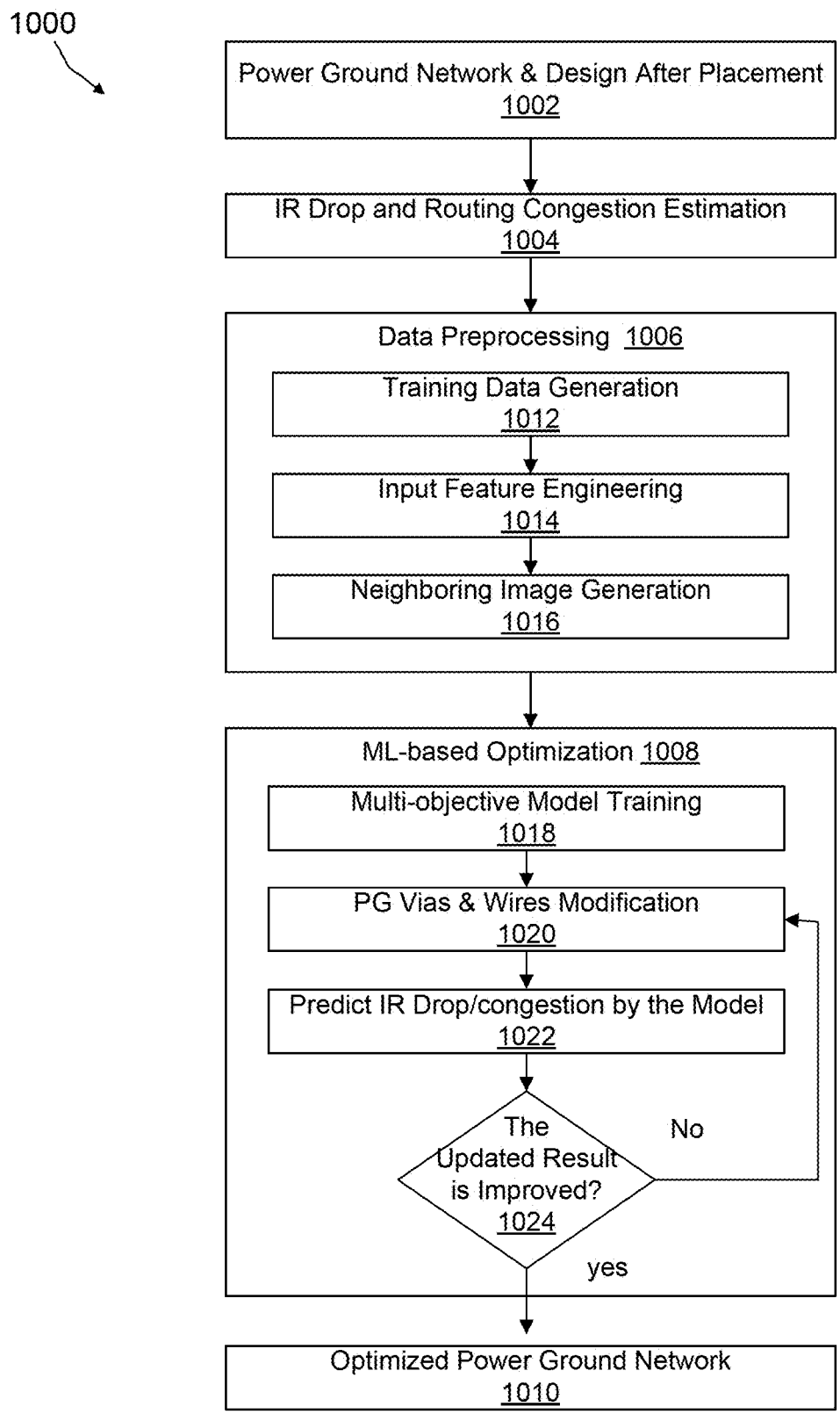
FIG. 10 is a flowchart of a P/G network planning method for an integrated circuit (IC) design, in accordance with an embodiment of the present disclosure.

FIG. 10 is a flowchart of a P/G network planning method 1000 for an IC design, in accordance with an embodiment of the present disclosure. In some embodiments, method 1000 may include a power ground network and design stage 1002, an IR drop and routing congestion estimation stage 1004, a data preprocessing stage 1006, a ML-based optimization stage 1008, and an optimized power ground network stage 1010.

In some embodiments, after P/G network design placement 1002, an IR drop analysis and routing congestion estimation may be performed for the IC design at the analysis and routing congestion estimation 1004. An IR drop may be estimated. In some aspects, dynamic IR drop may be determined using a vector-based or a vectorless analysis as described further below. During the data preprocessing stage 1006 that is described in detail further below, input and output data of the model may be collected. In the ML optimization stage 1008 that is described in detail below, a model may be trained (1018). The model may provide a fast estimation evaluation to guide P/G network-related ECO. For example, during the P/G vias and wires modification stage 1020, modifications to P/G vias and wires may be identified. In 1022, the IR drop/congestion are predicted by the model. In 1024, a determination may be made whether the IR drop/congestion have improved as described further below. If an outcome of the ECO according to the ML-based optimization is as expected, then an optimizer may store the proposed changes. However, if the performance degrades based on the proposed changes, then the proposed changes are discarded and the process returns to 1020.

In some embodiments, input features of the ML model may include an input, an output, one or more objectives, and one or more constraints. The input may be a design after a placement stage and the output may be a set of P/G vias and/or wires to be modified. One or more objectives may be minimizing the number of overflows, IR drop violation overhead, and/or peak dynamic IR drop overhead. The constraints, for example, may be peak dynamic IR drop to be less than or equal to 10% of the maximum voltage and/or a timing constraint such as total negative slack (summation of all negative slack) and/or worst negative slack (slack with a negative value and the lowest value), and the like.

In some embodiments, the data preprocessing stage 1006 may be divided into a training data generation substage 1012, an input feature engineering substage 1014, and a neighboring image generation substage 1016.

In the training data generation substage 1012, data may be collected from the IR drop analysis and routing congestion score calculation. The IR drop analysis may be for static IR drop and/or dynamic IR drop. By way of a non-limiting example, the dynamic IR drop analysis may be either vector-based and/or vectorless, depending on the switching activities. In Table 1, a comparison of the vector-based and the vectorless dynamic IR drop analysis is shown. Voltage values of PG pins may be obtained from available commercial tools. The worst dynamic IR drop on each cell may be calculated based on the voltage values.

TABLE 1

Comparison between vector-based and vectorless dynamic IR drop analysis

| | Vector-based | Vectorless |
|---|---|---|
| Generation | switching activity | toggling probability |
| Coverage | low | high |
| Patterns | close to real scenarios | over pessimistic analysis |

In some embodiments, for calculating a routing congestion score, a layout of the IC design may be partitioned into w×h routing grids, where the size of a grid equals the standard cell height.

In some embodiments, the congestion score $S(g_{i,j})$ in the $(i^{th}, j^{th})$ grid may be defined as follows:

$$S(g_{i,j}) = \Sigma_{k=1}^{L} \left( 2^{\frac{d(i,j,k)}{c(i,j,k)}} - 1 \right) \quad (1)$$

where d(i,j,k) is the demand value in the $(i^{th}, j^{th})$ grid in $k^{th}$ layer, where $S(g_{i,j})$ is the $(i^{th}, j^{th})$ grid of a layout, and where c(i,j,k) is the capacity value in the $(i^{th}, j^{th})$ grid in $k^{th}$ layer.

FIGS. 11A and 11B show an example of routing grids and routing congestion score after transformation using equation (1). FIG. 11A shows a grid 1100 annotated with the demand/capacity. FIG. 11B shows the grid annotated with the congestion score.

In some embodiments, since the congestion score of neighboring grids may have an impact to a center grid, all grids within a bounding box of a target cell may be considered for calculating the congestion score, as shown in equation (2), FIG. 12A, and FIG. 12B. Equation (1) calculates the congestion score for each grid. The congestion score for a target cell may be determined using equation (2).

Congestion score $S(c_k)$ of the $k^{th}$ cell may be expressed as:

$$S(C_k) = \frac{1}{\# \text{ of grids}} \times \sum_{i=x_k}^{x_k+w_{box}} \sum_{j=y_k}^{y_k+h_{box}} S(g_{i,j}) \quad (2)$$

FIG. 12A is a schematic that illustrates an IC layout 1200 with cells and P/G rails. In some aspects, a height of a target cell may refer to a standard cell height $h_{cell}$. FIG. 12B is a schematic that illustrates a bounding box 1202 for a target cell 1204. The bounding box coordinates of the target cell 1204 may be defined as (left, bottom)=$(x_k, y_k)$ and (right, top)=$(x_k+w_{box}, y_k+h_{box})$. The size of $h_{box}$ and $w_{box}$ may, therefore, be defined by equation (3). The parameter a may be used to adjust size of the bounding box.

$$h_{box} = w_{box} = \alpha \times h_{cell} \quad (3)$$

In some embodiments, the size of the bounding box may be based on the standard cell height and may be dependent on the IC design.

In some embodiments, in the input feature engineering substage 1014, raw data may be transformed into representative information of the IC design. The input features may include cell-based features, pin-based features, neighboring P/G rails-related features, and/or neighboring density-related features, as described below. The features may be local features and/or global features, for example. By way of a non-limiting example, input features may be referenced as scalar features in the present disclosure.

In some embodiments, the cell-based features may include a cell type (i.e., combinational or sequential), a position (i.e., x and y coordinates), an area (i.e., cell area), a total power (i.e., total of a leakage power, a static power, and a switching power), a number of pins (i.e., number of pins in the cell), a number of fanouts (i.e., a number of cells connected to an output pin).

In some embodiments, the pin-based features may include a peak current at power/ground pin ($I_{peak}$), a maximum input/output transition time at signal pin ($t_{in}$, $t_{out}$), and a maximum input/output capacitance at signal pin ($C_{in}$, $C_{out}$).

In some embodiments, the neighboring P/G rails features may include an average voltage in the connected power rails ($V_p$) and an average voltage in the connected ground rails ($V_g$).

The neighboring density features may include a pin area density, a cell area density, and a macro area density. The pin area density may be expressed as follows:

$$D_{pin}(\text{pin area density}) = \frac{\text{area of pins}}{\text{bounding box size}} \quad (4)$$

The cell area density may be expressed as follows:

$$D_{cell}(\text{cell area density}) = \frac{\text{area of cells}}{\text{bounding box size}} \quad (5)$$

The pin area density may be expressed as follows:

$$D_{macro}(\text{macro area density}) = \frac{\text{area of macros}}{\text{bounding box size}} \quad (6)$$

Figures 13A, 13B, 13C, 13D:
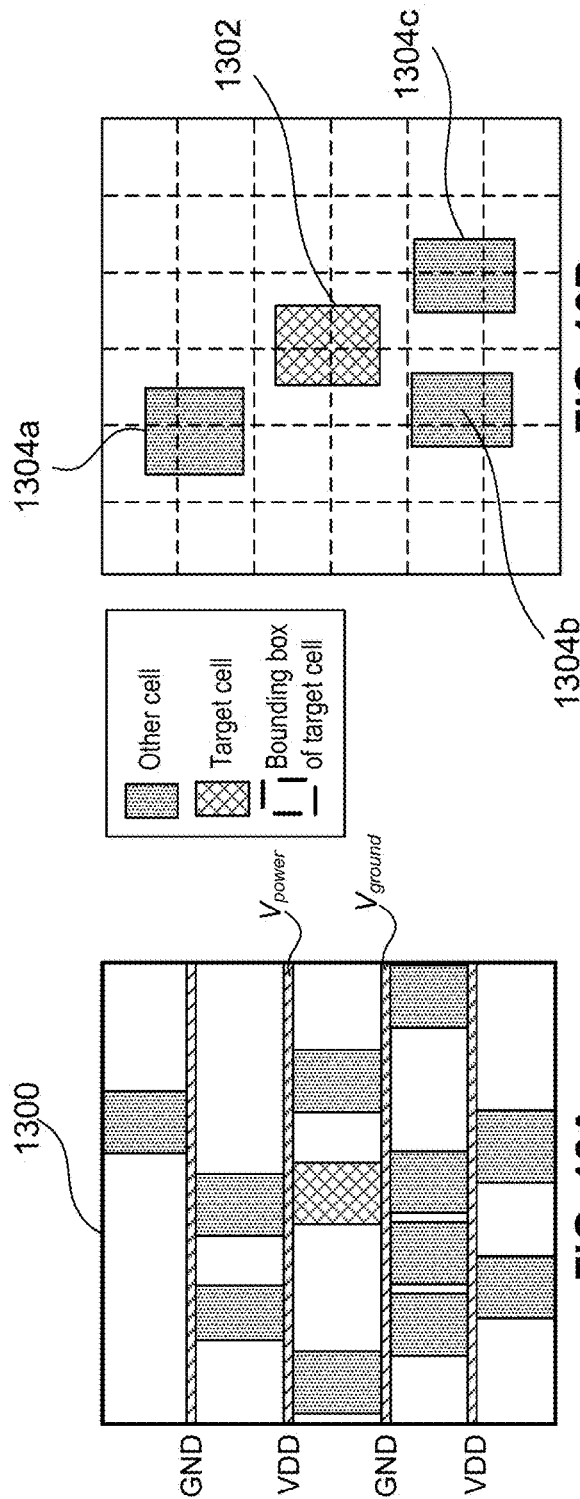
FIGS. 13A-13D are schematics that illustrate neighboring power/ground rails, charts of routing grid, and neighboring density, in accordance with an embodiment of the present disclosure.

FIGS. 13A-13D are schematics that illustrate neighboring power/ground rails, charts of routing grid, and neighboring density in accordance with an embodiment of the present disclosure. An IC layout 1300 may include a plurality of cells and power/ground rails along with power and ground pads. From the plurality of cells, a target cell 1302 and corresponding neighboring cells 1304a, 1304b, and 1304c may be selected for optimization (that are in the bounding box), as shown in FIG. 13B.

A density map 1306 for the demand/capacity is shown in FIG. 13C. The density map may be determined using equations (4), (5), and (6). FIG. 13D shows the density map with a bounding box 1308.

In Table 2, various features are compared.

TABLE 2

Comparison of various input features

| Cell-based features | Pin-based features | Local features | Global features |
|---|---|---|---|
| Cell type | P/G pin peak current | Power rail voltage drop | Minimum distance to tap |
| Position | Maximum input transition time | Ground rail voltage rise | Average distance to tap |
| Area | Maximum output transition time | Pin density | |
| Number of pins | Maximum input capacitance | Macro density | |
| Number of fanout | Maximum output capacitance | Cell density | |
| Total power | | | |

Figure 14:
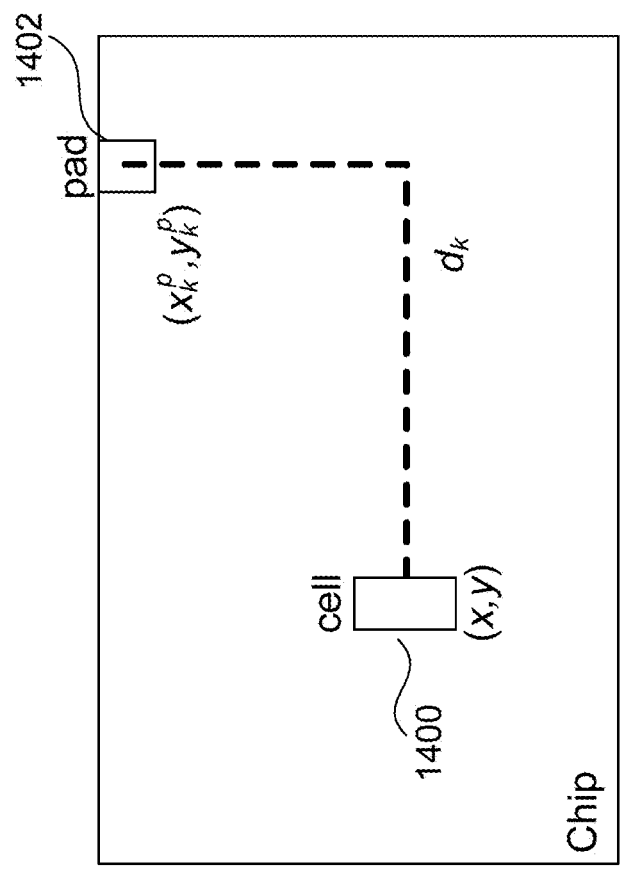
FIG. 14 is a schematic that illustrates measuring of a distance from a cell to a pad, in accordance with an embodiment of the present disclosure.

FIG. 14 is a schematic that illustrates measuring of a distance from a cell 1400 to a pad 1402, in accordance with an embodiment of the present disclosure. A distance from the cell 1400 located at ($x_i$, $y_i$) to the pad 1402 located at ($x_k^p$, $y_k^p$) may be calculated using equation (7):

$$d(i,k) = |x_i - x_k^p| + |y_i - y_k^p| \quad (7)$$

A maximum distance from a cell to a P/G pad may be calculated using equation (8):

$$d_{max}^i = \max d(i,k) \quad (8)$$

An average distance from a cell to a P/G pad may be calculated using equation (9):

$$d_{avg}^i = \frac{1}{N} \sum d(i, k) \quad (9)$$

In some embodiments, the IC design layout may be converted into images as input features in the neighboring image generation stage 1016. Accordingly, the neighboring P/G vias and wires may be converted into images. Further, as stated above, the IC design may have multiple layers. P/G for each layer may have a different impact on the routing congestion score. The metal layers may be divided into three levels: lower level, middle level, and upper level. The lower level may include metal layer 1 to metal layer 3. The remaining metal layers may be equally divided into the middle and upper levels.

Figure 15:
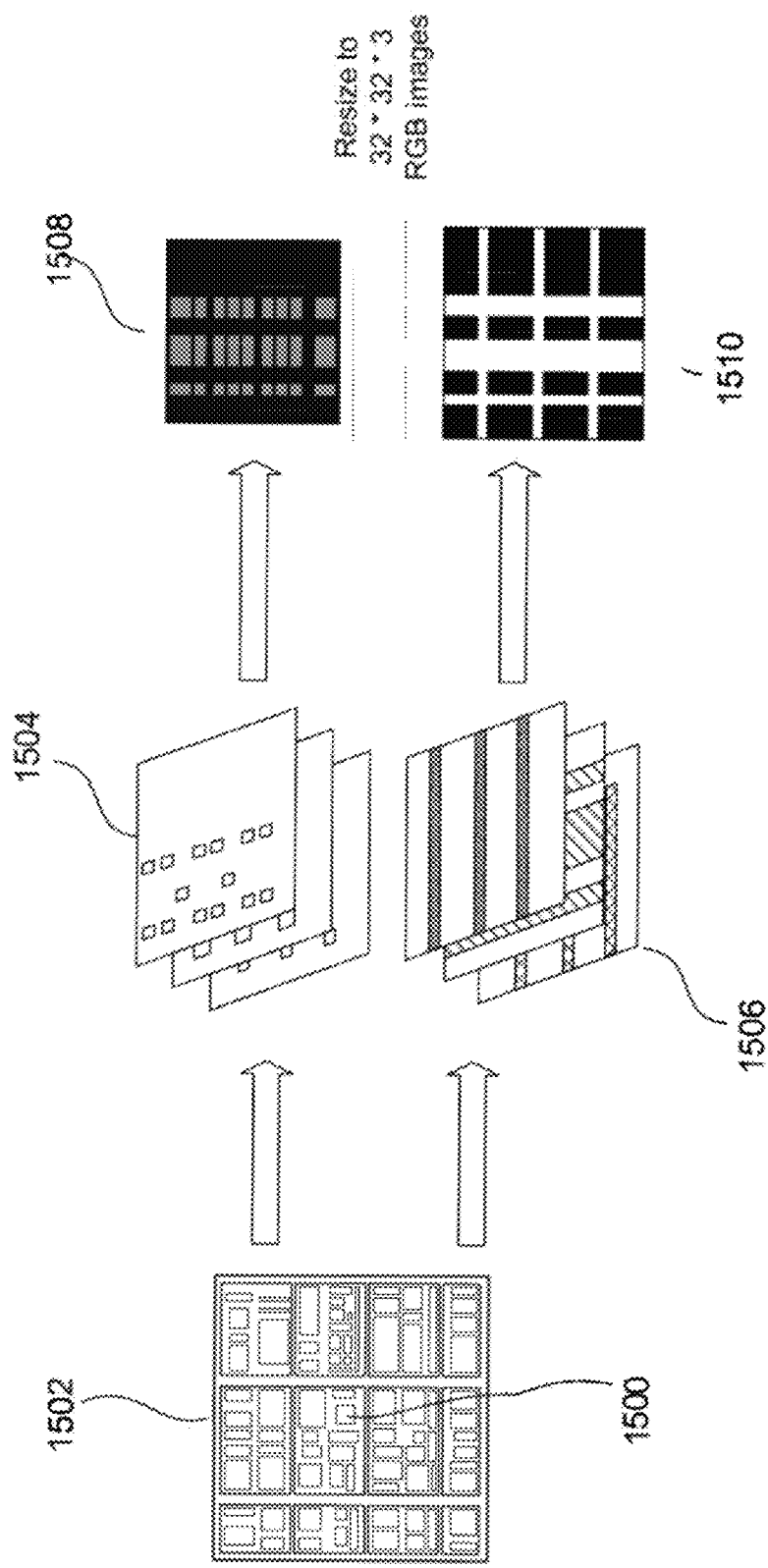
FIG. 15 is a schematic that illustrates a process of converting P/G vias and wires into normalized density maps, in accordance with an embodiment of the present disclosure.

FIG. 15 is a schematic that illustrates a process of converting P/G vias and wires into normalized density maps, in accordance with an embodiment of the present disclosure. A bounding box 1502 of a target cell 1500 may be in one or more metal layers. Accordingly, density maps for the P/G vias and wires in different layers may be generated and normalized. Density maps 1504 shows the PG vias density in different layers. Density maps 1506 shows PG wires density in different layers. In some aspects, the density maps 1504 and the density maps 1506 may be normalized to [0, 255]. Image 1508 corresponds to density map 1504 after normalization. Image 1510 corresponds to density map 1506 after normalization. The image 1508 and the image 1510 may be resized to 32×32×3 RGB images.

The preprocessed data may then be used to train the ML model. A pre-trained machine-learning model may reduce the training time.

Figure 16:
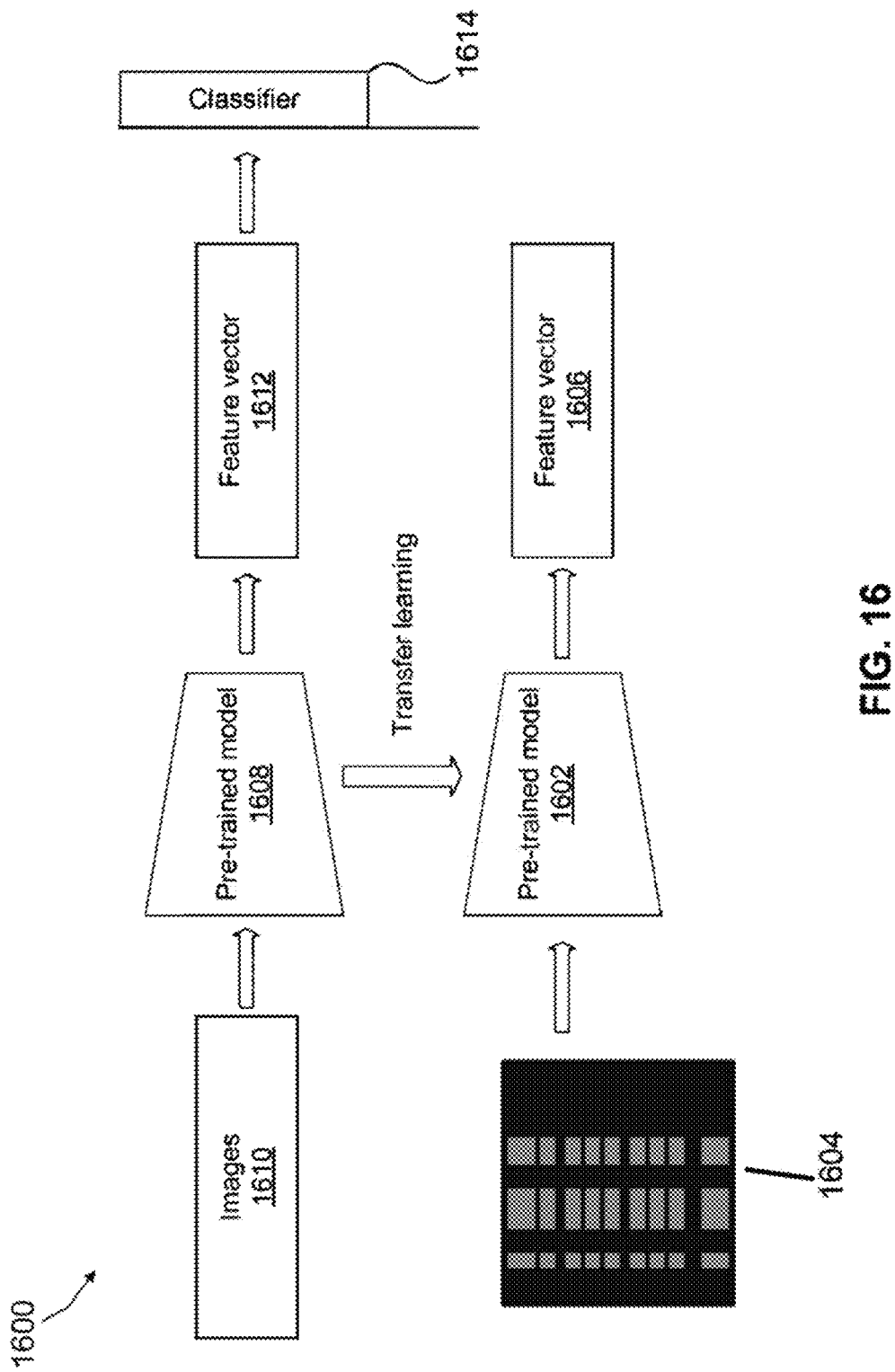
FIG. 16 is a schematic that shows a training flow, in accordance with an embodiment of the present disclosure.
Figure 17:
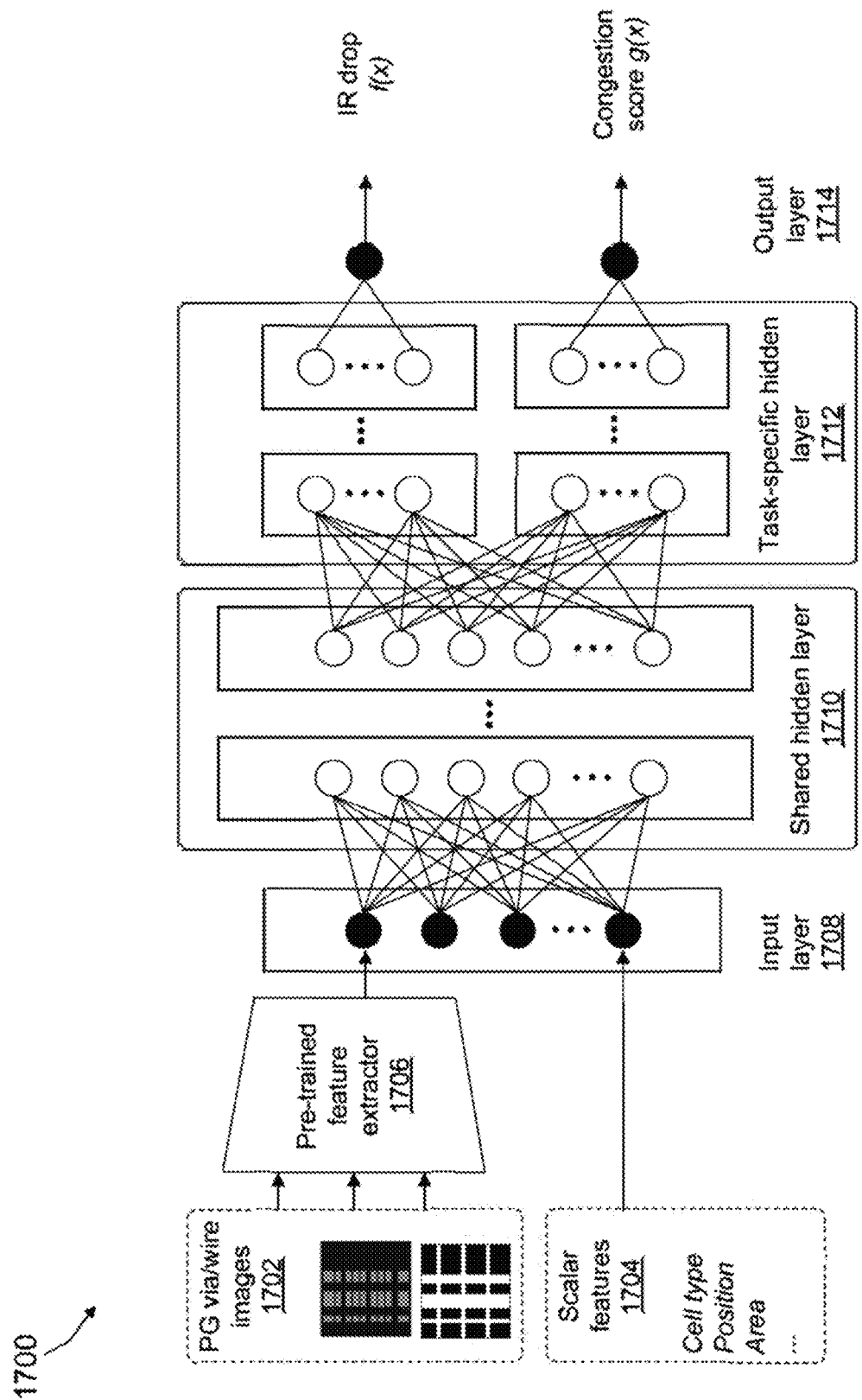
FIG. 17 is a schematic that shows a multitask learning model, in accordance with an embodiment of the present disclosure.

FIG. 16 is a schematic that shows a training flow 1600, in accordance with an embodiment of the present disclosure. A pre-trained model 1602 may serve as a feature extractor to reduce an image 1604 to a feature vector 1606 (lower dimension). In some aspects, transfer learning may be adopted to effectively extract feature and reduce training time. For example, a pre-trained model 1608 may be trained using a large image set 1610 to extract a feature vector 1612 and a classifier 1614. Then, transfer learning may be performed from pre-trained model 1608 to pre-trained model 1602. During the training stage, an image may be processed by the pre-trained model 1602 and then concatenated with other scalar features, as shown in FIG. 17. Thus, the pre-trained model 1602 shown in FIG. 16 can serve as feature extractor in FIG. 17.

FIG. 17 is a schematic that shows a multitask learning model 1700, in accordance with an embodiment of the present disclosure. P/G vias and/or wires images 1702 and scalar features 1704 may be concatenated using the multitask learning model 1700. The P/G vias and/or wires images 1702 may be processed by a pre-trained feature extractor 1706. The pre-trained feature extractor 1706 may be the pre-trained model 1602 discussed in relation to FIG. 16. The multitask learning model 1700 may be a neural network based model. The multitask learning model 1700 may have various layers. The multitask learning model 1700 may include an input layer 1708, a shared hidden layer 1710, a task-specific hidden layer 1712, and an output layer 1714.

An objective of the multitask learning model 1700 may be to generate an estimated IR drop and a congestion score. For example, the multitask learning model 1700 may generate the estimated IR drop and the congestion score as a function of the P/G vias and/or wires images 1702 and scalar features 1704. By way of a non-limiting example, the scalar features 1704 may include a cell type, position of the cell, area of the cell, and the like.

The shared hidden layer 1710 may be used to gain generality. The task-specific hidden layer 1712 may be used to generate the output. In some embodiments, by way of a non-limiting example, the following cost function as shown by equation (10) may be used to find a set of parameters to minimize errors between predicted values and golden values (measured, real, ideal, or desired values).

$$L(\theta) = \alpha \sum_{i=1}^{N} \frac{\|V(c_i) - f(x_i)\|^2}{N} + (1-\alpha) \sum_{i=1}^{N} \frac{\|S(c_i) - g(x_i)\|^2}{N} \quad (10)$$

where $V(c_i)$ is a golden dynamic IR drop of the $i^{th}$ cell instance, $S(c_i)$ is a golden congestion score of the $i^{th}$ cell instance, $f(x_i)$ is a predicted dynamic IR drop of the $i^{th}$ cell instance, $g(x_i)$ is a predicted congestion score of the $i^{th}$ cell instance, $x_i$ is a feature vector of the $i^{th}$ cell instance, and $\alpha$ is a normalization between two different cost. The objective may be $$\operatorname*{argmin}_{\theta} L(\theta)$$

where $\theta$ represents the parameters in the model. In some aspects, the golden values may be measured by a commercial tool. The commercial tool may be, as non-limiting examples, IC Compiler™ II from SYNOPSYS or Ansys RedHawk™ from ANSYS.

In some embodiments, the trained machine-learning model may then be used to predict the IR drop and routing congestion score predictions. Based on the predictions, the P/G vias and wires may be modified according to the objectives of reducing IR drop and increasing routing resources. Not all the P/G vias may have a high impact on the IR drop and routing congestion. Therefore, candidate P/G vias and wires may be selected for modification. The P/G vias for modification may be selected based on a distance and a voltage drop of a P/G via and clustered P/G vias using a k-means algorithm, as shown in equation (11). The k-means algorithm may be used to find the smallest distance summation from data points to a center point of each cluster.

$$\operatorname*{argmin}_{S} \sum_{j=1}^{k} \sum_{X \in S_j} \|X_i - \mu_j\| \quad (11)$$

Figure 18:
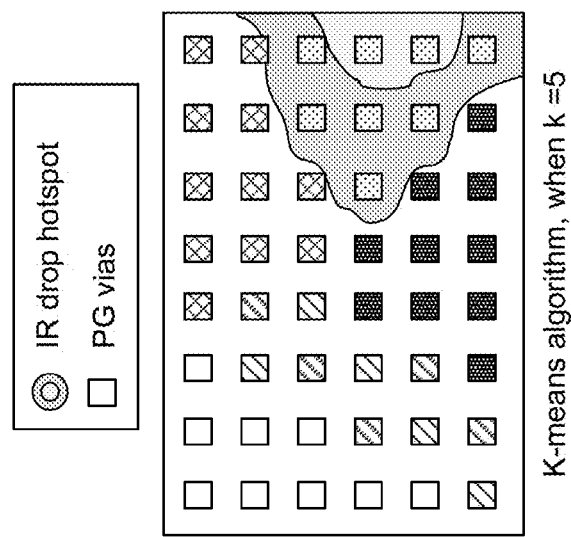
FIG. 18 is a schematic that illustrates an IR drop distribution map using a K-means algorithm, in accordance with an embodiment of the present disclosure.

FIG. 18 is a schematic that illustrates an IR drop distribution map 1800 using a K-means algorithm, in accordance with an embodiment of the present disclosure. A value of k may be 5. Accordingly, there may be k central points $\mu_1$, $\mu_2$, ..., $\mu_k$ in cluster $S_1$, $S_2$, ... $S_k$. $X_i$ may be equal to $(x_i^v, x_i^y, V(v_i))$, where $x_i^v$, $y_i^v$ are the position of the $i^{th}$ P/G via, and $V(v_i)$ represents voltage drop of the $i^{th}$ P/G via. Via modification using the IR drop distribution map 1800 may help avoid selecting a P/G via near the IR drop hotspot and may select a P/G via with the largest congestion score in each group.

In some embodiments, the P/G wire with the highest congestion score in the middle layers may be selected for modification.

Figure 19:
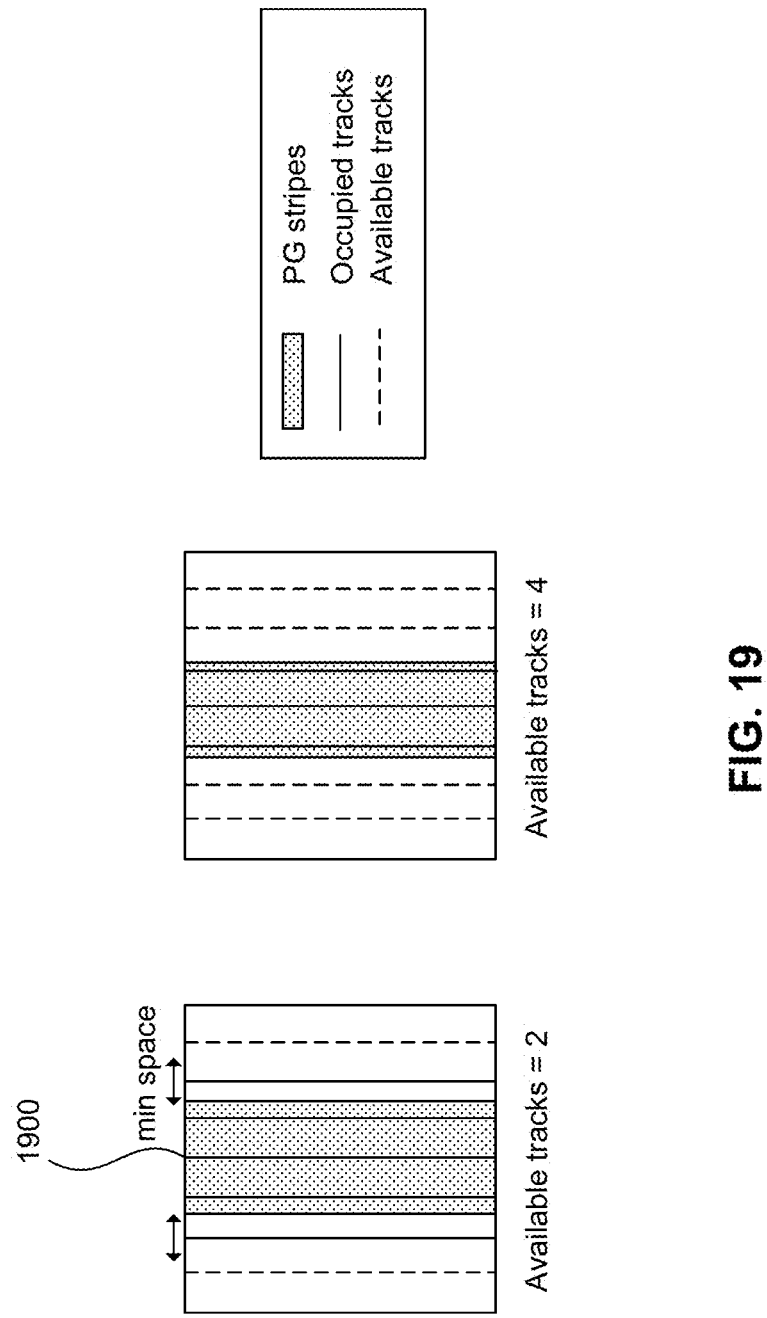
FIG. 19 is a schematic that illustrates available spacing between wires, in accordance with an embodiment of the present disclosure.

FIG. 19 is a schematic that illustrates available spacing between wires in accordance with an embodiment of the present disclosure. A width of a P/G wire 1900 may be modified according to the minimum space and the minimum width of a design rule. The P/G wires in the middle layers may have more improvement to routing congestion than a P/G wire in the upper layers. The P/G wires in the middle layers are also less sensitive than the P/G rails in the lower layers.

Figure 20:
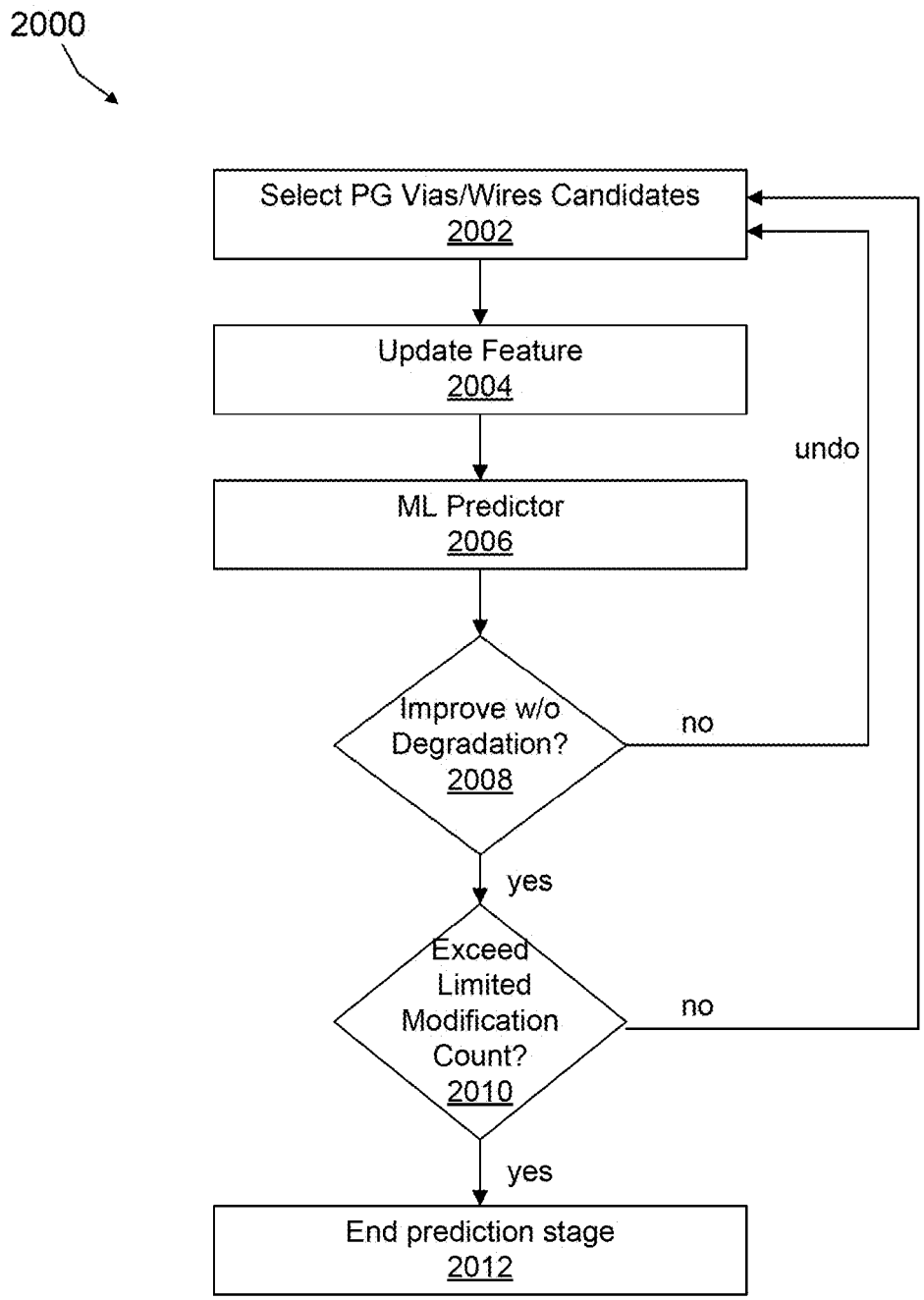
FIG. 20 is a flowchart for machine-learning-based optimization in a prediction stage, in accordance with an embodiment of the present disclosure.

FIG. 20 is a flowchart for machine-learning-based optimization 2000 in a prediction stage (e.g., stage 1022 in FIG. 10), in accordance with an embodiment of the present disclosure.

In 2002, P/G via and/or wire for modification may be selected and modified as described above. For example, the selected vias/wires based on the two methods described above may be removed.

In 2004, input feature and query cell instances are updated by the model upon modification of the selected P/G via and/or wire.

In 2006, the modified design may be processed again for the IR drop and routing resource congestion score prediction.

In 2008, a determination is made whether the modification shows an improvement. If the modification shows an improvement (i.e., resulting in a "Yes" in 2008), the process proceeds to step 2010. If the modification does not show an improvement (i.e., resulting in a "No" in 2008), then the process proceeds to step 2002 and the modification are undone. Thus, the update of the input feature are undone if the voltage drop performance degrades as a result.

In 2010, a determination is made whether a counter exceeds a limited modification count. The counter may be updated (e.g., incremented by an integer) when a modification is made. If the counter exceeds the limited modification count (i.e., resulting in a "Yes" in 2010, the process proceeds to 2012. If the counter does not exceed the limited modification count (i.e., resulting in a "No" in 2010), the process proceeds to step 2002. The limited modification count may be a predefined value representing a maximum number of vias or wire to remove, or the maximum number of times the modification of P/G via and/or wires can be reversed, or the maximum number of times modifications of the P/G via and/or wires may be performed. In some aspects, the maximum number of vias that can be removed may be equal to 10% of a total number of vias.

In 2012, the prediction stage ends.

Figure 21:
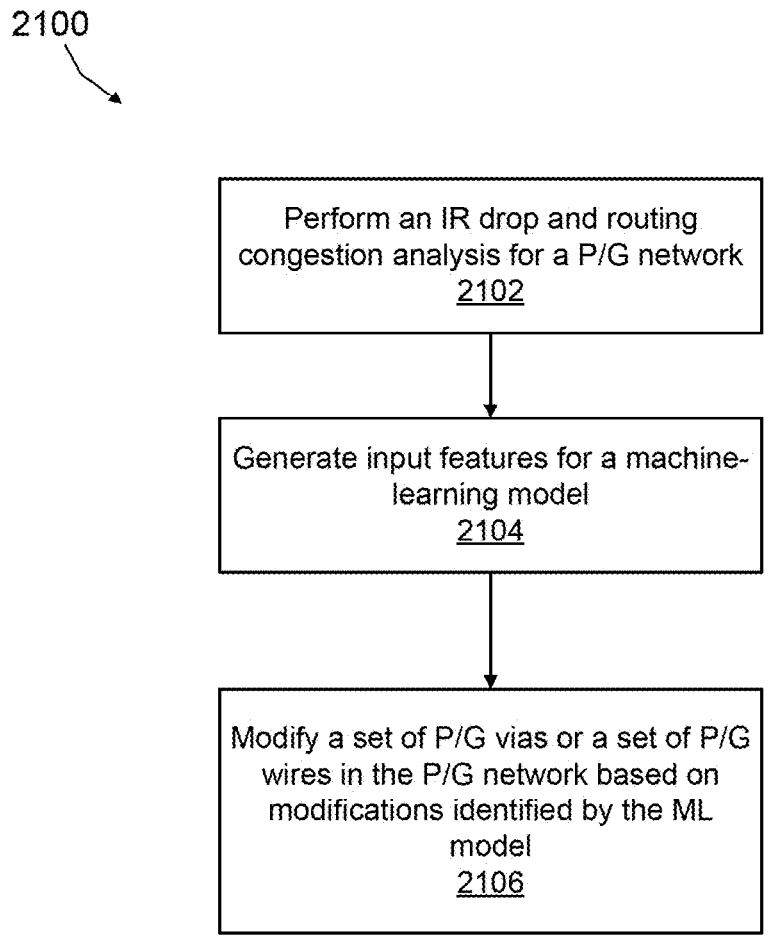
FIG. 21 is a flowchart for a method for power and ground (P/G) routing, in accordance with an embodiment of the present disclosure.

FIG. 21 a flowchart for a method 2100 for power and ground (P/G) routing, in accordance with an embodiment of the present disclosure. In 2102, an IR drop and routing congestion analysis is performed for a P/G network for the IC design.

In 2104, input features for a machine-learning (ML) model based on the IR drop and routing congestion analysis are generated. The input features may include the P/G via/wire images and the scalar features.

In 2106, a set of P/G vias or a set of P/G wires in the P/G network are modified according to modifications identified by the ML model. The ML model includes a feature extractor pre-trained using a plurality of P/G vias images and P/G wires images. In some aspects, the modifications are identified based on IR drop distribution map (e.g., distribution map shown in FIG. 18). The IR drop distribution map may be generated using the k-means algorithm. The IR drop distribution map may be a function of a voltage drop and a position of the via. The modifications may include removing a P/G wire or a P/G via when the IR drop performance does not degrade.

The approaches described herein may result in a speed up from 4% to 48% in the physical implementation of the IC design, in one embodiment. In addition, the runtime does not grow exponentially for a relatively larger design. The number of overflows is reduced by 10.4%. The IR drop degradation is small (e.g., about 0.45%). In addition, the correlation coefficient of IR drop and congestion is 0.996 (i.e., close to 1).

Figure 22:
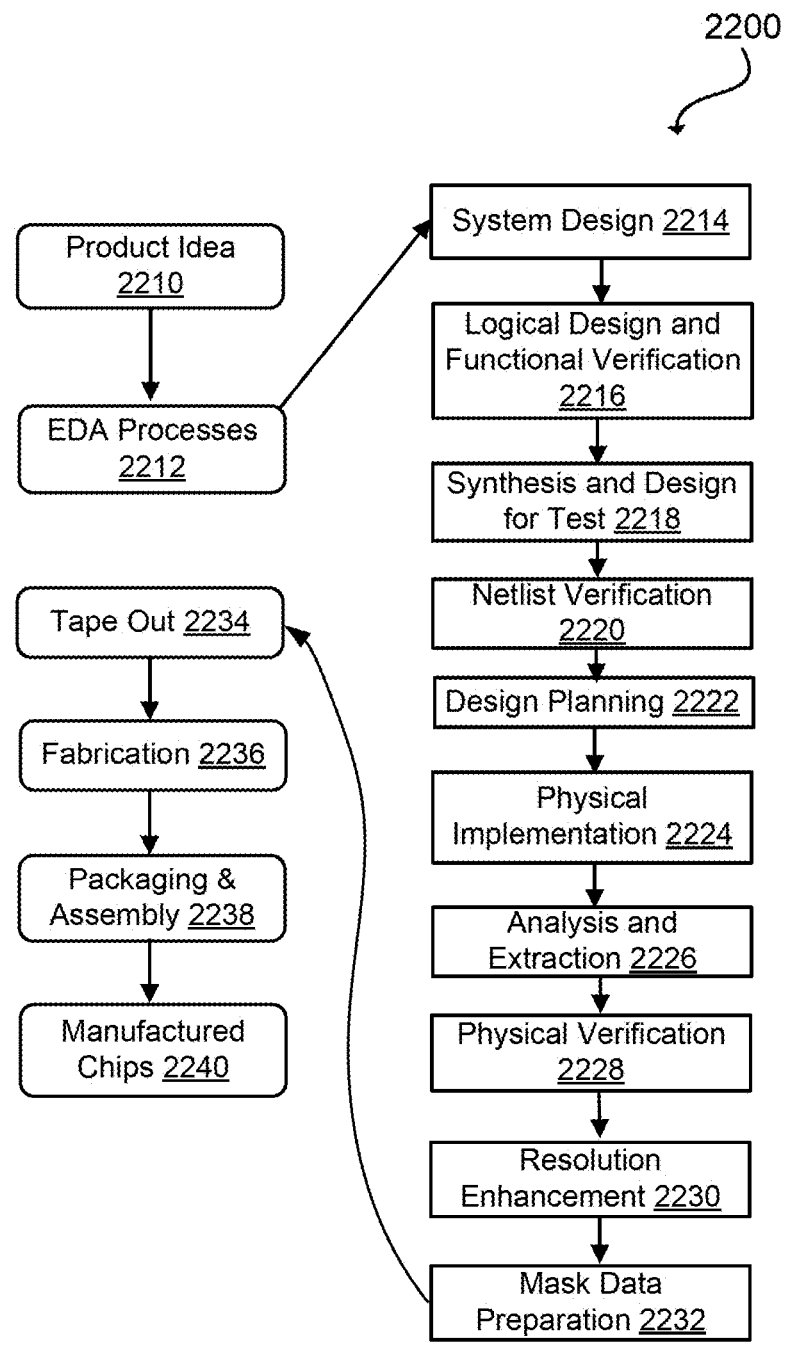
FIG. 22 depicts a flowchart of various processes used during the design and manufacture of an integrated circuit in accordance with some embodiments of the present disclosure.

FIG. 22 illustrates an example set of processes 2200 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 2210 with information supplied by a designer, information which is transformed to create an article of manufacture that uses a set of EDA processes 2212. When the design is finalized, the design is taped-out 2234, which is when artwork (e.g., geometric patterns) for the integrated circuit is sent to a fabrication facility to manufacture the mask set, which is then used to manufacture the integrated circuit. After tapeout, a semiconductor die is fabricated 2236 and packaging and assembly processes 2238 are performed to produce the finished integrated circuit 2240.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 22. The processes described can be enabled by EDA products (or EDA systems).

During system design 2214, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 2216, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 2218, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 2220, the netlist is checked for compliance with timing constraints and for correspondence with the HDL code. During design planning 2222, an overall floor plan for the integrated circuit is constructed and analyzed for timing and top-level routing.

During layout or physical implementation 2224, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 2226, the circuit function is verified at the layout level, which permits refinement of the layout design. During physical verification 2228, the layout design is checked to ensure that manufacturing constraints are correct, such as DRC constraints, electrical constraints, lithographic constraints, and that circuitry function matches the HDL design specification. During resolution enhancement 2230, the geometry of the layout is transformed to improve how the circuit design is manufactured.

During tape-out, data is created to be used (after lithographic enhancements are applied if appropriate) for production of lithography masks. During mask data preparation 2232, the 'tape-out' data is used to produce lithography masks that are used to produce finished integrated circuits.

A storage subsystem of a computer system (such as computer system 2300 of FIG. 23) may be used to store the programs and data structures that are used by some or all of the EDA products described herein, and products used for development of cells for the library and for physical and logical design that use the library.

Figure 23:
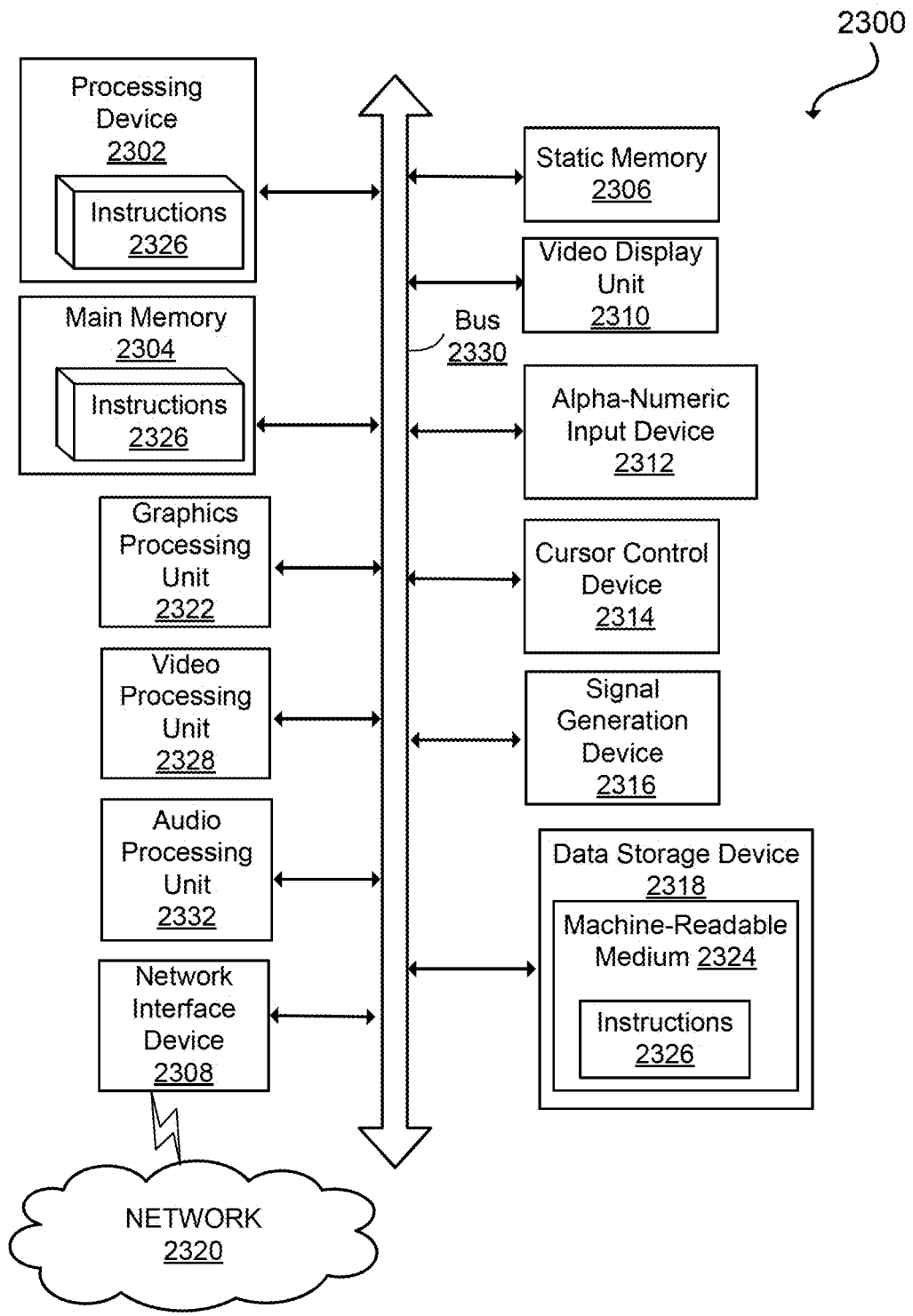
FIG. 23 depicts a diagram of an example computer system in which embodiments of the present disclosure may operate.

FIG. 23 illustrates an example machine of a computer system 2300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2300 includes a processing device 2302, a main memory 2304 (e.g., read-only memory (ROM), flash memory, dynamic random access memory (DRAM) such as synchronous DRAM (SDRAM), a static memory 2306 (e.g., flash memory, static random access memory (SRAM), etc.), and a data storage device 2318, which communicate with each other via a bus 930.

Processing device 2302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 2302 may also be one or more special-purpose processing devices such as an application specific integrated circuit (ASIC), a field programmable gate array (FPGA), a digital signal processor (DSP), network processor, or the like. The processing device 2302 may be configured to execute instructions 2326 for performing the operations and steps described herein.

The computer system 2300 may further include a network interface device 2308 to communicate over the network 2320. The computer system 2300 also may include a video display unit 2310 (e.g., a liquid crystal display (LCD) or a cathode ray tube (CRT)), an alphanumeric input device 2312 (e.g., a keyboard), a cursor control device 2314 (e.g., a mouse), a graphics processing unit 2322, a signal generation device 2316 (e.g., a speaker), graphics processing unit 2322, video processing unit 2328, and audio processing unit 2332.

The data storage device 2318 may include a machine-readable storage medium 2324 (also known as a non-transitory computer-readable medium) on which is stored one or more sets of instructions 2326 or software embodying any one or more of the methodologies or functions described herein. The instructions 2326 may also reside, completely or at least partially, within the main memory 2304 and/or within the processing device 2302 during execution thereof by the computer system 2300, the main memory 2304 and the processing device 902 also constituting machine-readable storage media.

In some implementations, the instructions 2326 include instructions to implement functionality corresponding to the present disclosure. While the machine-readable storage medium 2324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for power and ground (P/G) routing for an integrated circuit (IC) design, the method comprising:
   generating, using one or more processors, input features for a machine-learning (ML) model based on IR drop and routing congestion analysis for a P/G network for the IC design; and
   modifying, using the one or more processors, one or more of a P/G via and a P/G wire in the P/G network according to modifications determined by the ML model, wherein the ML model comprises a feature extractor pre-trained using a plurality of images of P/G vias and P/G wires.

2. The method of claim 1, wherein performing the IR drop and the routing congestion analysis comprises:
   partitioning the IC design into a plurality of routing grids;
   determining a congestion score for a grid of the plurality of routing grids based on a demand and capacity associated with the grid; and
   determining the congestion score of a target cell based on the score of the grid comprising the target cell and grids located within a bounding box associated with the target cell.

3. The method of claim 1, wherein generating the input features comprises: generating a density map for P/G vias or P/G wires of the P/G network for one or more metal layers of the IC design; and
   normalizing the density map to obtain an image of a P/G via or a P/G wire.

4. The method of claim 1, wherein the ML model is a neural network.

5. The method of claim 1, wherein an objective of the ML model is to reduce an error between a measured IR drop and a predicted IR drop, and between a desired congestion score and a predicted congestion score, wherein the ML model is a multitask learning model and the ML model is trained using the plurality of images of P/G vias and P/G wires.

6. The method of claim 1, further comprising:
   identifying a modification to a set of P/G vias or a set of P/G wires based on an IR drop distribution map generated using a k-means algorithm, wherein the IR drop distribution map is a function of a voltage drop and a position of a P/G via.

7. The method of claim 6, further comprising:
   regenerating the input features based on the modification.

8. The method of claim 1, further comprising:
   modifying another set of P/G vias or another set of P/G wires when a modification count is less than a threshold, wherein the threshold is indicative of a maximum number of P/G vias or P/G wires to be removed, a maximum number of time a modification of a P/G via or a P/G wire can be reserved, or a maximum number of times a modification of a P/G via or a P/G wire can be performed.

9. The method of claim 1, wherein modifying a set of P/G vias and a set of P/G wires comprises:
   removing a P/G via or a P/G wire when an IR drop performance does not degrade by its removal.

10. A system for power and ground (P/G) routing for an integrated circuit (IC), the system comprising:
    a memory storing instructions; and
    a processor, coupled with the memory and to execute the instructions, the instructions when executed cause the processor to:
       generate input features for a machine-learning (ML) model based on IR drop and routing congestion analysis for a P/G network for the IC design, and
       modify one or more of P/G via and P/G wire in the P/G network according to modifications determined by the ML model, wherein the ML model comprises a feature extractor pre-trained using a plurality of images of P/G vias and P/G wires.

11. The system of claim 10, wherein the processor is further configured to:
    partition the IC design into a plurality of routing grids;
       determine a congestion score for a grid of the plurality of routing grids based on a demand and capacity associated with the grid; and
       determine the congestion score of a target cell based on the score of the grid comprising the target cell and grids located within a bounding box associated with the target cell.

12. The system of claim 10, wherein the processor is further configured to:
    generate a density map for P/G vias or P/G wires of the P/G network for one or more metal layers of the IC design; and
    normalize the density map to obtain an image of a P/G via or P/G wire.

13. The system of claim 10, wherein the ML model is a neural network.

14. The system of claim 10, wherein an objective of the ML model is to reduce an error between a measured IR drop and a predicted IR drop and between a desired congestion score and a predicted congestion score, wherein the ML model is a multitask learning model and the ML model is trained using the plurality of images of P/G vias and P/G wires.

15. The system of claim 10, wherein the processor is further configured to:
identify a modification to a set of P/G vias or a set of P/G wires based on a IR drop distribution map generated using a k-means algorithm, wherein the IR drop distribution map is a function of a voltage drop and a position of a P/G via.

16. A non-transitory computer readable medium comprising stored instructions, which when executed by a processor, cause the processor to:
acquire an integrated circuit (IC) design;
generate a P/G network for the IC design;
perform an IR drop and routing congestion analysis for the P/G network for the IC design; and
modify the P/G network according to modifications determined by a machine learning (ML) model based at least on the IR drop and routing congestion analysis, wherein an ML model objective is to decrease routing congestion with less IR drop overhead, and wherein the ML model comprises a feature extractor pre-trained using a plurality of images of P/G vias and P/G wires.

17. The non-transitory computer readable medium of claim 16, wherein the processor is further configured to:
partition the IC design into a plurality of routing grids;
determine a congestion score for a grid of the plurality of routing grids based on a demand and capacity associated with the grid; and
determine the congestion score of a target cell based on the score of the grid comprising the target cell and grids located within a bounding box associated with the target cell.

18. The non-transitory computer readable medium of claim 16, wherein the ML model is a neural network.

19. The non-transitory computer readable medium of claim 16, wherein the processor is further configured to:
generate input features for the ML model based on the IR drop and routing congestion analysis.

20. The non-transitory computer readable medium of claim 16, wherein the processor is further configured to:
generate a density map for P/G vias or PG wires for one or more metal layers of the IC design; and
normalize the density map to obtain a P/G via image or a P/G wire image.

* * * * *